United States Patent [19]
Herman et al.

[11] 3,725,915
[45] Apr. 3, 1973

[54] HIGH RESOLUTION MAPPING SYSTEM

[75] Inventors: Elvin E. Herman, Pacific Palisades; Henry L. McCord, San Pedro, both of Calif.

[73] Assignee: Hughes Aircraft Company, Culver City, Calif.

[22] Filed: Dec. 27, 1960

[21] Appl. No.: 78,768

[52] U.S. Cl. ................................ 343/5 PC, 343/5 R
[51] Int. Cl. ................................................. G01s 9/42
[58] Field of Search ......................... 343/5 R, 5, 5 PC Primary Examiner—Carl D. Quarforth
Assistant Examiner—J. M. Potenza
Attorney—W. H. MacAllister, Jr. and Ernest L. Brown

[57] ABSTRACT

A synthetic array mapping system is disclosed that is operable from a moving craft so as to provide a high resolution map of an area such as a sector of the earth's surface. A coherent side looking redar system is provided in the moving craft to obtain and store varying frequency doppler history components of objects in the area to be mapped. The stored history components are then mixed with a swept oscillator signal. Difference signals developed by this mixing are applied to a narrow-band filter to compare the frequency of the difference signal with a predetermined pass band and develop mapping signals representing objects in a fixed angular position relative to the flight path of the craft.

16 Claims, 9 Drawing Figures

INVENTOR.
ELVIN E. HERMAN,
HENRY L. McCORD,
BY
Walter J. Adam
ATTORNEY.

INVENTORS.
ELVIN E. HERMAN,
HENRY L. McCORD,
BY Walter J. Adam
ATTORNEY.

HIGH RESOLUTION MAPPING SYSTEM

This invention relates to mapping systems and particularly to a radar synthetic array mapping system that provides a map with a very high degree of resolution of objects.

For mapping large areas of the earth from an aircraft or from a high vantage point, normal optical photography is conventionally utilized. However, photographic pictures are generally only obtainable in the daytime and during the presence of favorable atmospheric conditions. Also, photographic techniques conventionally provide focusing at only a single range or distance. It is often advantageous to be able to obtain a map over a wide area and regardless of the presence of an unfavorable atmosphere. Radar mapping systems provide a means to obtain a high resolution map irrespective of weather or lighting conditions.

Radar mapping systems operating from a moving craft may utilize a narrow pulse side looking radar system and a processor that responds to the doppler frequency shift for determining the presence and the location of objects to be mapped. One processing system utilizes a plurality of doppler filters arranged in parallel for simultaneously processing radar information recorded from ground objects at a plurality of ranges. The signals passed through the doppler filters are then sampled and further processed for recording information on the final map. However, in this arrangement, the phases of the incoming doppler signals are not corrected, hence the doppler filters are only responsive to a short duration interval of the total doppler history and the result is what corresponds to an infinity focused, or as it is sometimes called, an unfocused map. Although in principle this parallel processing arrangement can be focused at the ranges of the mapping coverages, it has the disadvantage of complexity and excessive weight because of the large number of parallel elements required for mapping a large area. Another arrangement for radar ground mapping utilizes a coherent light source and an optical system to process stored radar information. Although this system can be focused at all ranges of interest, it is slow in operation because of limitations in obtaining high intensity along with coherency in the light source. Further, it requires a storage media which does not degrade the coherency of the light. Also, the optical system of this arrangement has the disadvantages of being relatively complex and bulky and requiring a large number of critical optical adjustments.

A requirement for a radar mapping system is that elements within the area being mapped be distinguished or resolved as finely as possible in both dimensions so that small details as well as gross patterns are recognizable on the final map, that is, the system must have a high degree of both range and azimuth resolution. The resolution of objects in the area being mapped is determined in range by the effective pulse duration of the radar and is determined in azimuth by the angular sector over which the signal return is combined. Conventionally a very large antenna is required in order to obtain a high degree of azimuth resolution. However, an antenna mounted on an aircraft or other vehicle is limited in size by aerodynamic and other physical considerations. A synthetic array system that processes information received from a relatively small antenna so as to develop a synthetic antenna equivalent to a very large antenna would provide a high degree of angular resolution and be operable from high speed aircraft. A simplified and reliable mapping system that has a high degree of azimuthal resolution and that provides focusing at all ranges of interest so as to define small details of the area being mapped would be very advantageous to the art.

It is, therefore, an object of this invention to provide a radar mapping system that has a high degree of resolution in azimuth.

It is a further object of this invention to provide a system that processes radar information in a serial manner and at a rapid rate so as to form a simplified but high speed map-forming system.

It is a still further object of this invention to provide a synthetic array radar system operable from a moving vehicle that resolves objects utilizing a relatively small antenna with comparable resolution as would be afforded by a conventional radar utilizing a relatively large antenna, thereby providing an accurate and detailed map of a selected area.

It is another object of this invention to provide a system for sequentially and rapidly processing doppler information into a high resolution strip map form with a minimum of equipment.

It is another object of this invention to provide a mapping system that provides focusing of a synthetic array so that all ranges of interest are well defined on the output display.

Briefly, this invention is a radar mapping system operable from a moving craft to form a synthetic antenna array so as to provide a high resolution map of an area such as a sector of the earth's surface. A coherent side looking radar system is provided in the moving craft to obtain varying frequency doppler history components of objects in the area to be mapped. The doppler history components from different range intervals of the area being mapped are then stored on a two-dimensional medium. A reading device then sequentially samples a portion of the recorded doppler history along each range interval. The resultant output signals which vary in approximately a linear fashion in frequency during the sample are then mixed with a signal generated by a swept oscillator having a predetermined frequency variation. Difference signals developed by the mixing of the informational signal and the signal generated by the swept oscillator are then applied to a narrow-band filter. This filter compares the frequency of the difference signals with a predetermined pass band to develop mapping signals representing objects in a fixed angular position relative to the flight path of the craft. The mapping signals are applied to a display and/or recording device that is controlled by the aircraft velocity and by the reading sequence of the reading device to form indications of the objects in their relative positions within the area being mapped.

The novel features of the invention, as well as the invention itself, both as to its organization and method of operation, will best be understood from the accompanying description, taken in connection with the accompanying drawings, in which like characters refer to like parts, and in which:

FIG. 9 is a schematic diagram of a final map having range and azimuth dimensions developed by the system of FIGS. 1 and 2 representing similar dimensions of the area being mapped in FIG. 3.

Figure 1:
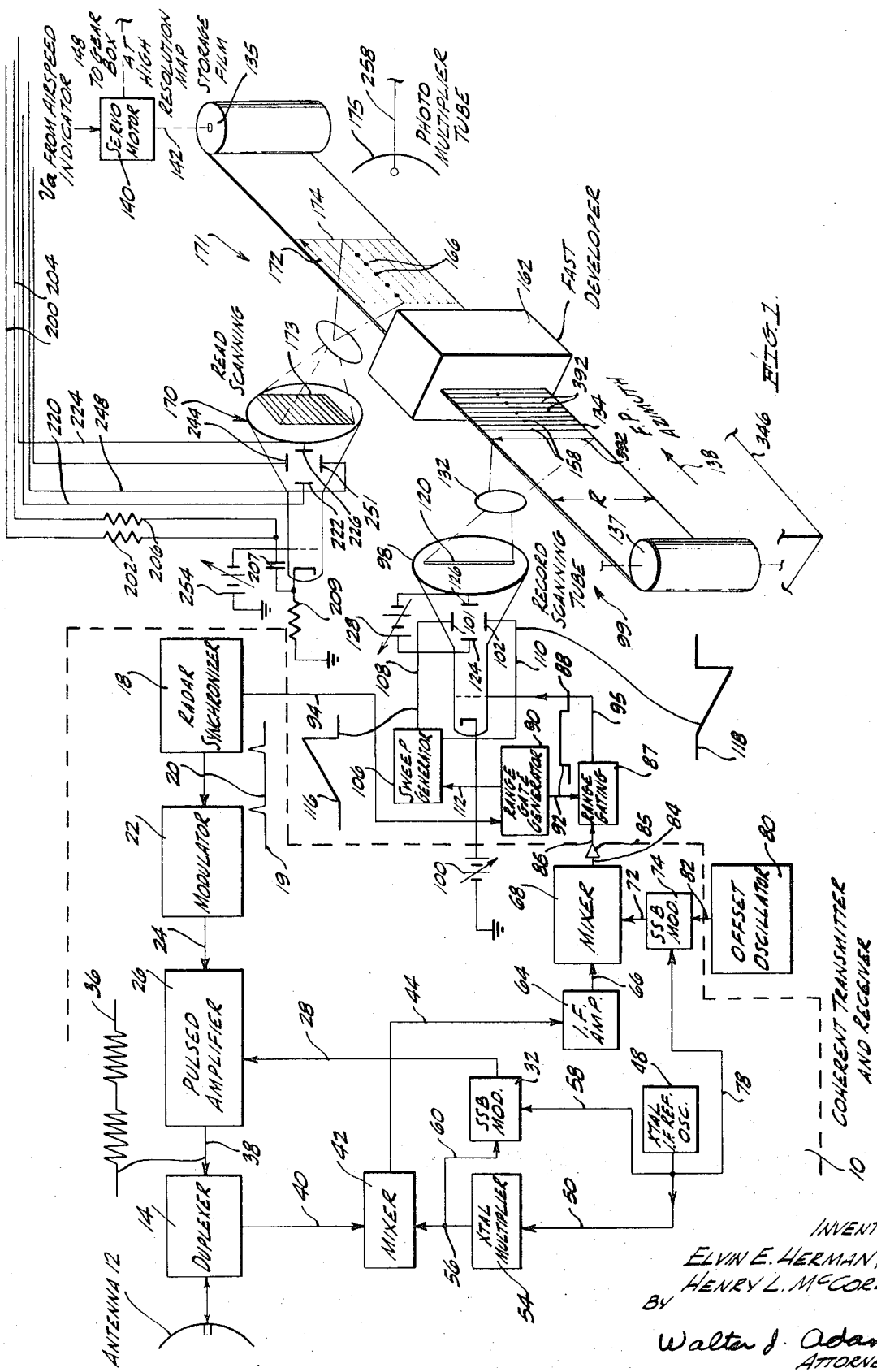
FIGS. 1 and 2 are schematic block and circuit diagrams of the mapping system in accordance with this invention.
Figure 2:
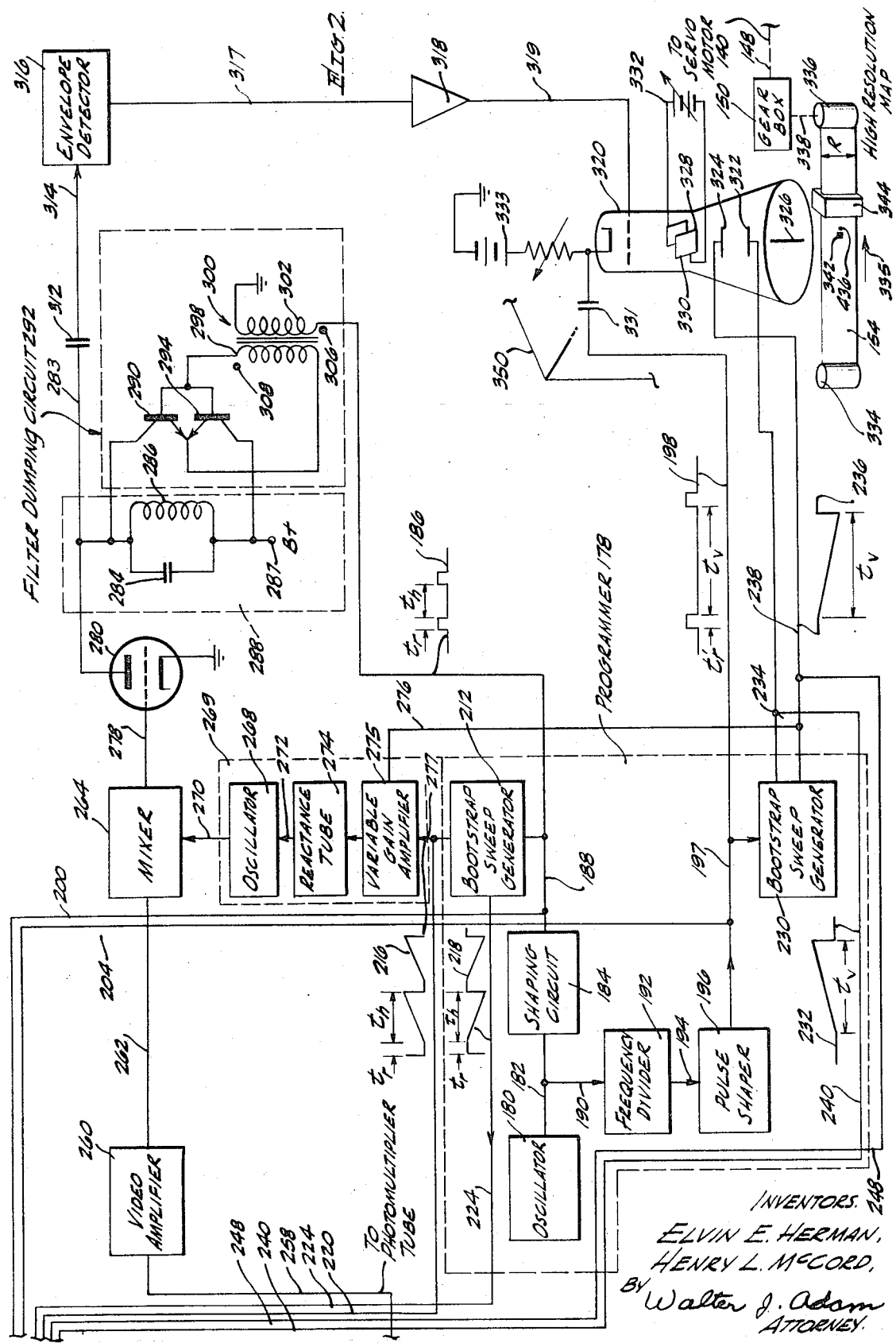

Referring first to FIGS. 1 and 2, the arrangement of the elements of the mapping system in accordance with this invention will be explained. In order to perform reliable recording of information received from a target, a coherent transmitter and receiver 10 is provided which may include an antenna 12 fixedly mounted on the side of a craft and coupled to a duplexer 14. Because of the operation of the system of this invention to provide a synthetic array, the antenna 12 may have a relatively small width. For transmission of RF (Radio Frequency) energy into space, a radar synchronizer 18 applies synchronizing pulses of a waveform 19 through a lead 20 to a modulator 22 where the synchronizing pulses are shaped or squared. The modulator 22 then applies the synchronized modulator pulses through a lead 24 to a pulsed amplifier 26 which amplifies and gates RF signals which are applied thereto through a lead 28 from a single sideband (SSB) modulator 32. The pulsed RF signals gated and amplified by the pulsed amplifier 26, as shown by a waveform 36, are then applied through a lead 38 through the duplexer 14 and to the antenna 12 for being transmitted into space.

When an RF signal containing a plurality of modulated pulses representing doppler mapping information is intercepted by the antenna 12 after being reflected from a plurality of objects to be mapped (FIG. 3), the intercepted signal is applied from the duplexer 14 through a lead 40 to a mixer 42 to be heterodyned to an IF (Intermediate Frequency) signal on a lead 44. For developing the local oscillator signal for the mixer 42, a stable crystal IF reference oscillator 48 is provided to operate at the IF frequency. The signal developed by the oscillator 48 is applied through a lead 50 to a crystal multiplier 54 which multiplies the IF reference signal to a signal at radio frequency minus the selected intermediate frequency. The signal developed by the multiplier 54 is then applied through a lead 56 to the mixer 42 so that it can heterodyne the intercepted signal to form the IF signal on the lead 44.

In order to provide phase coherency between the transmitted and received signals, the IF reference signal developed by the crystal oscillator 48 is applied through a lead 58 to the single sideband modulator 32.

The signal on the lead 56 is also applied through a lead 60 to the single sideband modulator 32. Thus, a coherent radio frequency signal which is offset by the IF reference signal is developed by the single sideband modulator 32 and applied through the lead 28 to the pulsed amplifier 26 for transmission into space.

In reception the IF signal carrying the doppler mapping information, after having been heterodyned in the mixer 42, is then applied through the lead 44 to an IF amplifier 64 and in turn through a lead 66 to a mixer 68 which develops a video signal including pulse modulation components having amplitude variations representative of the doppler frequency of the signals received from each point object to be mapped, as will be explained subsequently. The reference signal for the mixer 68 is applied thereto through a lead 72 from a single sideband modulator 74 which is controlled by the IF reference signal from the stable crystal oscillator 48 through a lead 78. In order that the doppler frequency components may be shifted to a desirable operating range away from zero frequency, an offset oscillator 80 is coupled to the single sideband modulator 74 through a lead 82. The resulting output of the single sideband modulator 74 is slightly offset in frequency from that of the IF reference oscillator 48. The video signal of doppler modulation components, after being heterodyned downward in frequency in mixer 68 by the offset IF reference frequency, is applied from the mixer 68 through a lead 84 to a video amplifier 85 which passes as the bi-polarity video signal, only the lower sideband components developed by the heterodyning operation in mixer 68. It is to be noted that a conventional phase detector may be utilized to develop the video signals in place of the mixer 68 and the video amplifier 85.

The video signal passed through the video amplifier 85 is applied through a lead 86 to a range gating circuit 87 which is controlled by gating pulses of a waveform 88 applied thereto from a gate generator 90 through a lead 92. The range gate generator 90 is synchronized with the radar system in response to synchronizing signals of the waveform 19 received from the radar synchronizer 18 through a lead 94. The informational video signal consisting of doppler modulated pulses, after being gated to select a desired range of mapping, is applied from the range gating circuit 87 through a lead 95 to the intensity grid of a record scanning tube 98 of a storage device 99. The cathode of the record tube 98, which tube may be a conventional cathode ray tube, is biased by an adjustable source of potential such as a battery 100 so that the modulated pulses of the video signals can control the intensity of the electron beam. The vertical deflection plates 101 and 102 may be coupled to a sweep generator 106 through respective leads 108 and 110. The range gate generator 90 is coupled through a lead 112 to the sweep generator 106 so as to provide a vertical sweep on the leads 108 and 110 shown by respective waveforms 116 and 118 during the gating interval of the waveform 88. The sweep signals of the waveforms 116 and 118 are inverted so that during the gating interval an electron beam is deflected along a vertical path indicated by a trace 120 on the screen of the tube 98, the vertical distance of the trace 120 representing the range interval of the area being mapped, as will be explained subsequently. In order to maintain the trace 120 in a desirable horizontal position, horizontal deflection plates 124 and 126 are biased at a desired fixed potential by an adjustable source of potential such as a battery 128.

The electron beam developed by the record tube 98 causes a beam of light to be emitted from the screen of the tube 98 through a focusing lens 132 to a storage film 134 having a dimension from top to bottom of varying range R corresponding to the area being mapped. The storage film 134 is suitably arranged between reels 135 and 137 to move at a precise rate in a direction indicated by an arrow 138 which, as will be explained subsequently, represents the flight path of the aircraft and the azimuth of the area being mapped. A suitable servo-motor 140 is coupled through a shaft 142 to the reel 135 to provide movement of the film 134 at a desired speed proportional to the velocity of the aircraft $v_a$ which may be derived from a conventional airspeed indicator (not shown). In order to provide for constancy of the final mapping scale factor parallel to the aircraft flight path, the speed of a high resolution mapping film 154 (FIG. 2) should be maintained at a fixed proportion relative to the raw data film 134. In the method shown the servo-motor 140 has a suitable mechnical connection 148 coupled to a gear box 150 (FIG. 2) so that a desired velocity relation is maintained between the speed of a movement of the film 134 and the high resolution map 154 (FIG. 2). As the storage film 134 moves in the direction of the arrow 138 recording doppler frequency information as sinusoidal variations of intensity indicated at a single range interval by dots 158 representing the peaks of the doppler modulation for convenience of illustration, the film is developed in a suitable fast developer tank 162 so that, for example, the dots 158 become the more opaque areas on the film 134 as indicated by doppler history dots 166.

It is to be noted at this time that the magnitude of the sinusoidal variations of intensity on the recording film 134, as illustrated by the dots 166, is representative of the amount of reflection of point objects to be mapped. It is to be understood that the storage device 99 including the record tube 98 and the storage film 134 is only one example of various types of storage devices that may be utilized.

Now that the radar and intermediate recording and storage portion of the mapping system has been explained, the arrangement of the elements of the sequential processor will be explained. A read scanning tube 170 of a reading device 171 is provided to sequentially scan the recording film 134 in horizontal essentially constant range lines such as 172 through the entire range interval R or over a raster or frame 173 shown on the screen of the tube 170 and as frame or raster 174 on the film 134, so that the bipolarity video doppler signals, recorded as sinusoidal variations of intensity, develop variations in light level to be sensed by a photomultiplier tube 175. It is to be noted at this time that the frames such as 174 are continuously repeated as the film 134 moves in the direction of the arrow 138.

The scan pattern of the read scanning tube 170 is controlled from a programmer 178 as seen in FIG. 2 which includes an oscillator 180 for providing a signal at a stable readout line repetition rate. The signal developed by the oscillator 180 is applied through a lead 182 to a shaping circuit 184 for developing rectangular pulses on a lead 188 having a width $t_r$ and separated by a time interval $t_h$ between pulses as shown by a waveform 186. The signal developed by the oscillator 180 is also applied through a lead 190 to a frequency divider 192 and in turn through a lead 194 to a pulse shaper 196 to develop rectangular pulses on a lead 197 having a width $t_r'$ and separated by a time interval $t_v$ as shown by a waveform 198. The interval $t_h$ between pulses of the waveform 186 and the interval $t_v$ between pulses of the waveform 198 have a fixed relation for respectively developing the range sampling scan indicated by the line 172 on the recording film 134 and for developing the vertical component of the raster such as 174. The waveform 186 is applied from the lead 188 through a lead 200 to one end of the resistor 202 (in FIG. 1) and the waveform 198 is applied from the lead 197 through a lead 204 to one end of a resistor 206 (in FIG. 1), the other ends of the resistors 202 and 206 being coupled in common through a coupling capacitor 207 to the cathode of the read scanning tube 170. The cathode of the tube 170 is coupled to ground through a resistor 209. The results of the summing action of the resistors 202 and 206 in conjunction with the resistor 209 bias the tube 170 to cut off during the presence of pulses of the waveforms 186 and 198 so as to eliminate the electron beam during flyback operation thereof.

A bootstrap sweep generator 212 in FIG. 2 responds to the pulses of the waveform 186 on the lead 188 to develop horizontal sweep signals in push-pull form as shown by waveforms 216 and 218. The horizontal sweep signal of the waveform 216 is applied through a lead 220 to a horizontal deflection plate 222 of the tube 170 and the horizontal sweep signal of the waveform 218 is applied through a lead 224 to the other horizontal deflection plate 226. Thus, the horizontal sweep signals of the waveforms 216 and 218 being repetitive each time interval $t_h + t_r$ control the read tube 170 to develop the horizontal essentially constant range sweep indicated by the lines such as 172 (FIG. 1) for scanning the recording film 134.

To control the vertical sweep of the read scanning tube 170 and to sequentially scan the film 134 at different range elements during the time of each raster such as 174, a bootstrap sweep generator 230 responds to the pulses of the waveform 198 to develop a vertical sweep signal of a waveform 232 on leads 234 and 240 and an inverted vertical sweep signal of a waveform 236 on leads 238 and 248. The vertical sweep signal of the waveform 232 is applied through the lead 240 to a vertical deflection plate 244 of the tube 170 and the vertical sweep signal of the waveform 236 is applied through a lead 248 to a vertical deflection plate 251 for controlling the electron beam of the tube 170 to scan sequentially over each range element such as indicated by the line 172 and over a plurality of constant range lines to produce a raster such as 174. The intensity grid of the read scanning tube 170 is biased from a variable DC source such as a battery 254.

It is to be noted that the horizontal sweep signals developed by the read scanning tube 170 can be reversed in direction and the direction of the vertical sweep of the read scan tube 170 can also be reversed. However, when reversing the direction of the vertical sweep, it is also necessary to reverse the direction of the sweep on the display tube (FIG. 2) and the compensation for focusing at all ranges, as will be explained subsequently.

The video signal developed by the photomultiplier tube 175 consists of frequencies resulting from scanning the recorded doppler frequencies at a high rate. Because these recorded doppler components are read out in a time interval much shorter than their original recording interval, all frequency components are scaled upward in frequency by a constant factor. These signals are applied through a lead 258 to a suitable video amplifier 260 (FIG. 2) and in turn through a lead 262 to a mixer 264. The linearly varying output frequency of the swept oscillator 269 is applied through a lead 270 to the mixer 264. This linearly varying frequency from the swept oscillator serves as a reference signal for comparison with the varying frequency of sampled doppler history of the video signal on the lead 262. The reference signal developed by the swept oscillator 269 varies in frequency over a programmed excursion. It is this programmed varying reference frequency which, when heterodyned against the recorded doppler histories, provides for focusing in the azimuth coordinate. If the reference frequency were maintained constant instead of being swept in frequency during each doppler history readout and assuming a straight line flight path, then the system described herein would be focused at infinite range.

Figure 3:
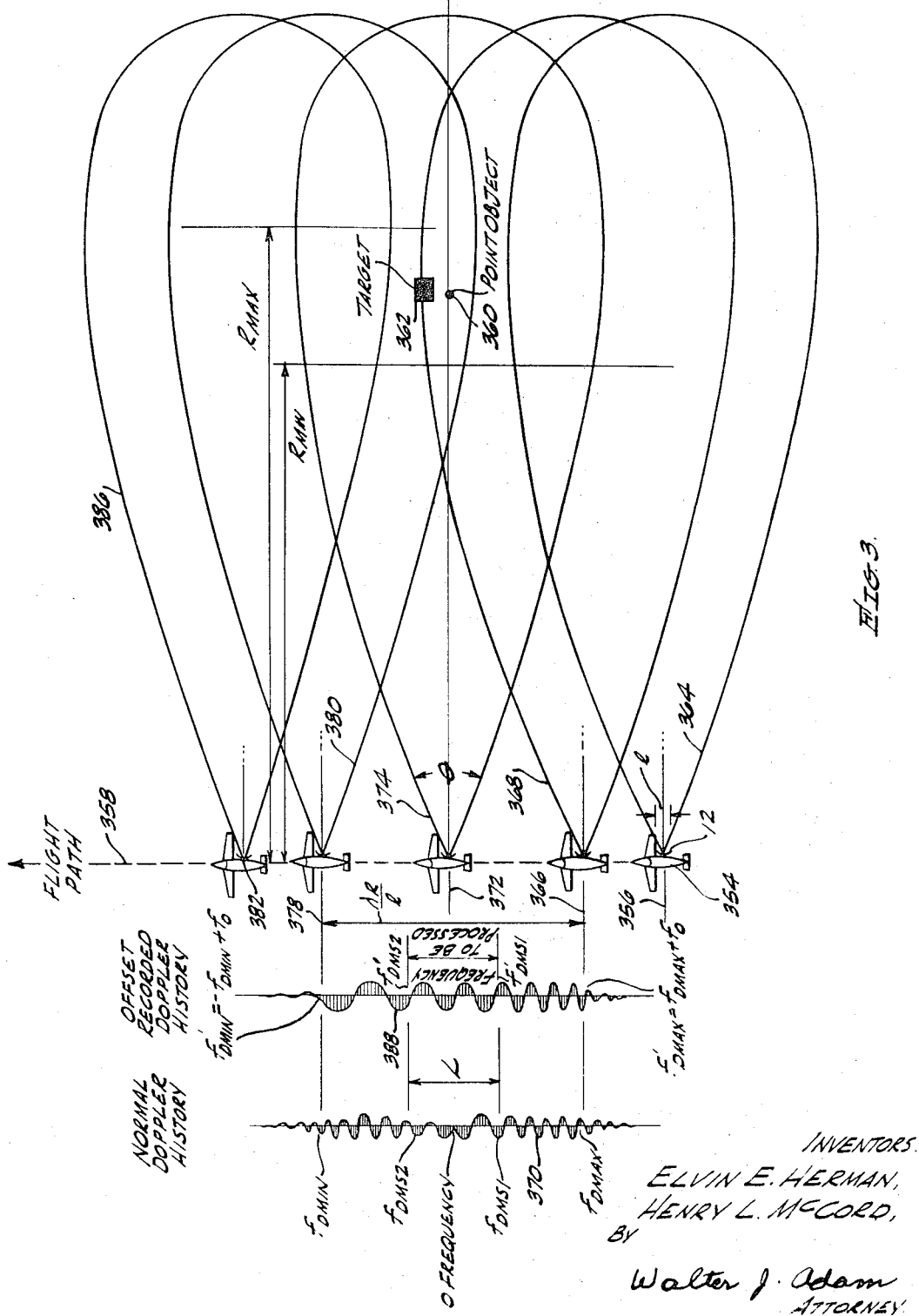
FIG. 3 is a schematic diagram of the moving aircraft and the area being mapped for explaining the development of the doppler target history signals.

The oscillator 268 which may be of a conventional Hartley type is controlled through a lead 272 from a conventional reactance tube 274 which in turn is controlled by the output from a variable gain amplifier 275 through a lead 276. The variable gain amplifier 275 may be a pentode controlled in gain at its suppressor grid by the vertical sweep signal of the waveform 236 through a lead 276 while the input at its control grid consists of the horizontal sweep signal of the waveform 216 applied through a lead 277. The variable gain accomplished in amplifier 275 by the vertical sweep waveform 236 maintains the electronic focusing optimum at all ranges of interest by varying the slope of the frequency excursion of the swept oscillator as a function of the range of the readout trace. The output of the variable gain amplifier 275 provides the waveform which controls the linear frequency variation of the oscillator 268. The rate of change of frequency is varied in accordance with the range of the objects being sampled so as to provide a synthetic array focused at all ranges of interest. The linear frequency variation developed by the oscillator 268 is the reference signal on the lead 270 and varies at a frequency rate representative of the returns from objects in a selected angular region viewed from the flight path of the craft (FIG. 3). The signal representing the difference in frequency between the reference signal developed by the swept oscillator 268 and the doppler history read from the storage film 134 is applied from the mixer 264 through a lead 278 to the grid of an amplifier tube 280. The cathode of the tube 280 is grounded and the anode is coupled through a lead 283 to a filter 288 which may include a parallel coupled capacitor 284 and an inductor 286 coupled between the lead 283 and a suitable positive potential B+ applied to a terminal 287. The filter 288 is selected with a relatively narrow pass band so that only difference signals having a selected frequency of interest applied from the mixer 264 are not shorted to the B+ terminal 287. It is to be noted that a single stage filter 288 is shown for simplicity of illustration but additional tuned stages may be cascaded to alter the filter bandpass characteristic. The filter 288 provides integration and a comparison of the frequency of the difference signals with the pass band thereof so that information obtained from objects over a selected angular zone from the flight path of the craft (FIG. 3) is passed therethrough, as will be explained subsequently.

The lead 283 is coupled to the collector of a transistor 290 of a dumping circuit 292 so that prior to the start of the sweep of the waveform 216 the energy in the filter 288 is discharged. The transistor 290 which may be of the n-p-n type has its emitter coupled to the emitter of a transistor 294 also of the n-p-n type, which in turn has its collector coupled to the terminal 287. The bases of the transistors 290 and 294 are jointly coupled to one end of a winding 298 of a transformer 300, the other end of the winding 298 being coupled to the emitters of the transistors 290 and 294. A second winding 302 of the transformer 300 has one end grounded and a second end coupled to the lead 188 for responding to the horizontal pulses of the waveform 186 before each sweep of the waveform 216. The transformer 300 may have a polarity arrangement indicated by dots 306 and 308 so as to bias the transistors 290 and 294 into conduction during the occurrence of the pulses of the waveform 186. In the absence of a pulse of the waveform 186, both transistors 290 and 294 remain nonconductive thereby permitting signals on the lead 283 to integrate in the filter 288, if of a proper frequency.

The filtered and integrated signal on the lead 283 is applied through a coupling capacitor 312 to a lead 314 and in turn to an envelope detector 316 for developing a detected signal indicative of the amplitude of the signals integrated in the filter 288. The detected signal is applied from the envelope detector 316 through a lead 317, a suitable amplifier 318 and a lead 319 to the intensity grid of a high resolution display tube 320 for controlling the intensity of the electron beam developed thereby. The display tube 320 has vertical deflection plates 322 and 324 coupled respectively to leads 234 and 238 for responding to the vertical sweep signal of the waveforms 232 and 236 to form a range deflection indicated by a line 326 on the screen of the tube 320. The horizontal deflection plates 328 and 330 maintain the electron beam at a fixed horizontal position by a battery 332. For blanking of the electron beam of the tube 320 during flyback time, the cathode is coupled through a DC isolating capacitor 331 to the lead 197 to respond to the vertical timing pulses of the waveform 198. A variable DC source of potential such as a battery 333 is coupled to the cathode of the tube 320 through a suitable isolating resistor.

In operation the signal applied to the intensity grid of the tube 320 controls the electron beam intensity during the vertical trace. This trace is imaged by a lens (not shown) onto the film 154. The instantaneous range position R of the electron beam is determined by the vertical sweep voltages of the waveforms 232 and 236. The optical image of the electron beam records element by element a high resolution map on film 154.

This recorded film may move in a direction indicated by an arrow 335 on rotating reels such as 334 and 336 with the reel 336 controlled through a shaft 338 from the gear box 150 which is connected through the mechanical connection 148 to the servo-motor 140. For developing information recorded on the map 154, such as an object 342, a fast developing tank 344 may be provided.

The recording film 134, the record scanning tube 98 and the read scanning tube 170 are enclosed in a light free area indicated by a box 346 so that undesired light does not contaminate the information to be recorded or read onto the film 134. It is to be noted that in order to isolate the light source of the read scanning tube 170, the box 346 may be divided between the read scanning tube 170 and the record scanning tube 98. Also, the high resolution display tube 320 and recording film 154 are enclosed in a light free area indicated by box 350 so that undesired light does not affect the final picture on the map 154.

Referring now to FIG. 3, as well as to FIGS. 1 and 2, the general theory and operation of obtaining doppler target history in accordance with this invention will be explained. An aircraft 354 with the antenna 12 fixedly mounted to the side thereof may be moving in a straight line from a position 356 along a flight path 358 relative to a point object 360. It is to be noted that in general the operation of the mapping system in accordance with this invention will be explained relative to a single point to be mapped but that the operation is similar for a plurality of objects, each having a plurality of points thereon such as the target 362. When the craft 354 is in the position 356, the main lobe 364 of the antenna 12 does not illuminate the object 360 so that essentially no doppler information is reflected therefrom. As the craft 354 moves to a position 366, the main antenna lobe now in position 368 begins to illuminate the point object 360 with electromagnetic energy. Since there is a component of velocity toward the target 360, the reflected energy is slightly shifted upward in frequency. This upward frequency shift or doppler signal when translated down to low frequency is indicated by a waveform 370 at a maximum frequency of $f_{D\ MAX}$ for the illustrated lobe position 368. As the aircraft moves forward, the velocity component toward the target decreases toward zero. The waveform 370 shows an envelope or the modulation on the pulse train if it were not offset away from zero frequency. As the craft 354 moves to position 372, the antenna main lobe has shifted to position 374 and is now centered at the point object 360 and the doppler frequency on the pulsed RF return has decreased to zero. When the craft 354 moves to a position 378, the edge of the antenna lobe at position 380 is intercepting the object 360 so that the reflected RF energy has downward doppler shift. This doppler shift is shown on waveform 370 as a modulation envelope of the pulse train again increasing in frequency away from zero. By the time the antenna has reached position 378 the received signals from point object 360 have their most negative doppler shift which when translated give the waveform envelope 370 corresponding to frequency $F_{D\ MIN}$. Also, as the craft 354 moves to a position 382, the antenna lobe position 386 has moved beyond illumination of the point object 360 so that essentially no pulses are received therefrom.

Figure 4:
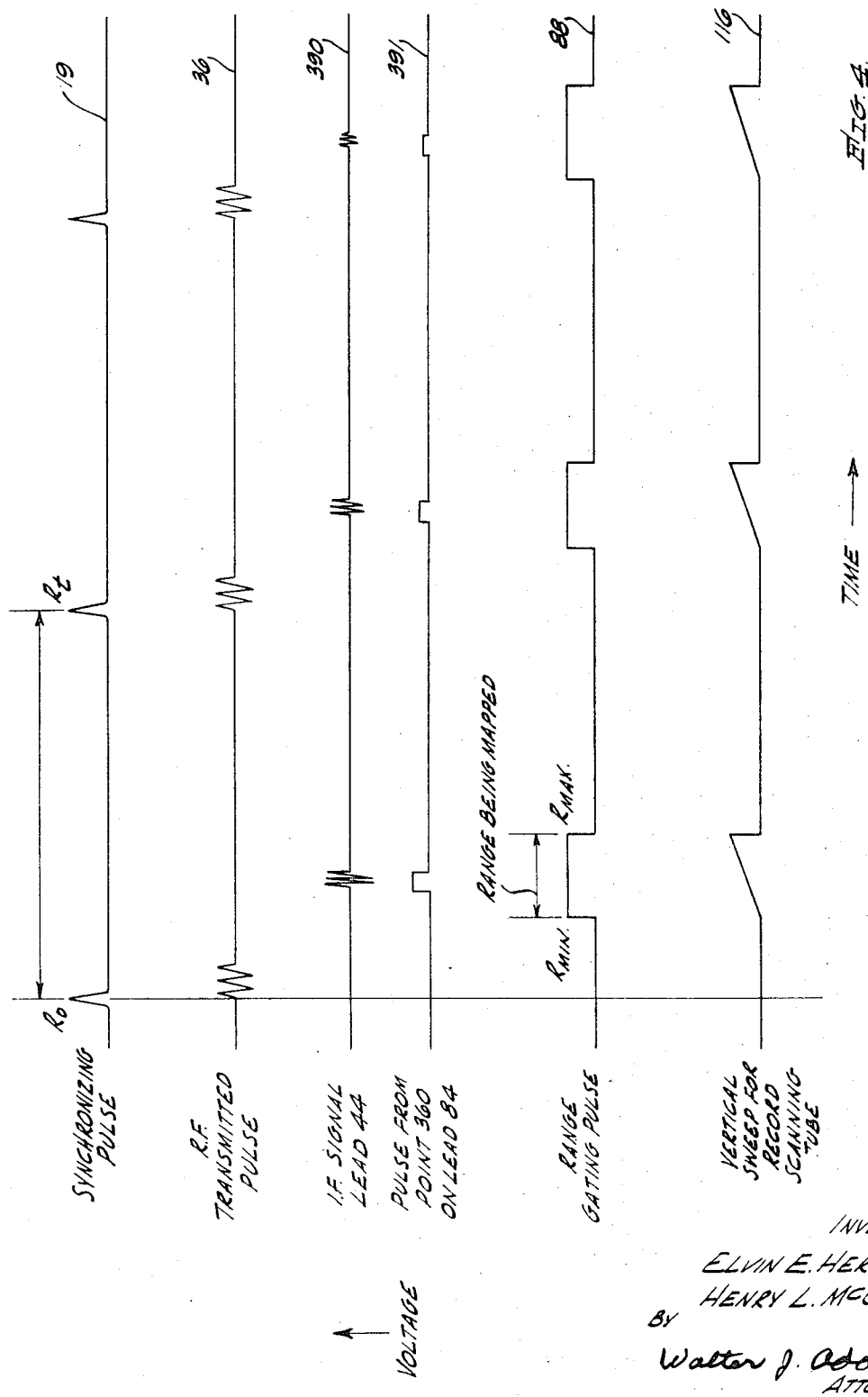
FIG. 4 is a diagram of waveforms for explaining the operation of the radar system of FIGS. 1 and 2 to record doppler information of an area being mapped.

The doppler signal of the waveform 370 represents the envelope or modulation of the bi-polar pulse train of the single point object 360 after being translated to a low frequency, but similar signals are also received from all objects to be mapped between an arbitrary range $R_{MIN}$ and $R_{MAX}$ and within the illumination area of the lobe positions such as 374. Because the doppler envelope signal of the waveform 370 passes through a zero frequency, the offset oscillator 80 of FIG. 1 is provided to translate all the received signals to a slightly higher frequency $f_o$ than was shown in waveform 370, thereby developing a pulse train having a modulation envelope of a waveform 388 on the lead 84 which contains the same doppler target information as the waveform 370 but varies between a frequency $f_D'_{MAX} = f_{D\ MAX} + f_o$ and a frequency $f_{D'MIN} = -f_{D\ MIN} + f_o$. Thus, the previously discussed modulation component of the waveform 370 is only shown for purposes of explanation. Frequencies $f'_{DMS\ 1}$ and $f'_{DMS\ 2}$ at the waveform 388 are shown to indicate the portion of the received frequencies which will be processed to form the final map image corresponding to point object 360. This portion of the received frequencies will also dictate the selection of the program frequencies of the swept oscillator 269 of FIG. 2. It is to be noted that the selection of the program frequency range for the swept oscillator 269 determines the squint angle of the high resolution synthetic array beam relative to the flight path of the arrow 358 during the processing which in the example of FIG. 3 is selected to process the information broadside to the flight path of the craft. A distance L which is equal to a selected segment of the flight of the craft 354 while illuminating a point target such as 360 is also the length of the synthetic array developed by the system in accordance with this invention, as will be explained subsequently Referring now to the waveforms of FIG. 4, as well as to FIGS. 1, 2 and 3, the operation of the radar and recording portion of the system will be further explained. The RF transmitted pulses of the waveform 36 having a selected pulse repetition frequency are transmitted from the antenna 12 in response to the synchronizing pulses of the waveform 19. The synchronizing pulses of the waveform 19 have an interpulse period representative of a range interval between zero range $R_o$ to total radar range $R_t$. Pulsed signals are reflected over the entire range interval between $R_o$ to $R_t$ from a plurality of targets such as 360 and 362 of FIG. 3, are intercepted by the antenna 12, and contain pulse modulation doppler information for each point target as indicated by the envelope of the waveform 370 of FIG. 3. The intercepted RF signals are then heterodyned in the mixer 42 to an IF signal as shown by the pulses of IF energy from a single point target of a waveform 390, amplified and then applied to the mixer 68. These pulsed IF signals of the waveform 390 are then mixed with a signal at a frequency $f_o$ + IF from the single sideband modulator 74 controlled by the oscillator 48 and the offset oscillator 80 to provide a frequency offset modulated pulse train for each point object or target, the envelope of the modulation being shown by the waveform 388 of FIG. 3 for the point object 360. In FIG. 4 a few of the pulses of varying amplitude including the doppler modulation are indicated for the single point 360 by a waveform 391. The pulses of the waveform 391 vary in amplitude and polarity in response to the phase relation between the signals of the waveform 390 and the offset mixing signal on the lead 72. Thus, the bi-polarity video amplitude variation of the pulses on the lead 84 results from heterodyning the doppler shifted target echo components against an offset IF reference supplied to mixer 68 through lead 72 so that the modulation envelope is made up of a train of bi-polarity pulses varying in amplitude due to the doppler frequency and the offset in response to the relative phase of the signals on the leads 66 and 72. The video amplifier 85 has a band-width sufficient to provide the desired range resolution. For any single echo, the polarity and amplitude of the video signal such as the waveform 391 is directly dependent upon its phase in mixer 68 relative to the offset IF reference applied through lead 72. It is to be noted that although the waveform 388 of FIG. 3 shows only the return from a single target, the composite signal applied through the video amplifier 85 to the lead 86 may include a large plurality of pulsed echo signals derived from a plurality of targets at different range and azimuth positions between the entire radar range $R_o$ to $R_t$. From amplifier 85 the video signal is then applied to the range gating circuit 87 which is controlled by the gating pulse of the waveform 88 to pass only a portion of the total video signal, representing information received between the ranges $R_{MIN}$ and $R_{MAX}$ (FIG. 3), to the intensity grid of the record scanning tube 98. The sweep generator circuit 106 responds to the range gating pulses similar to the waveform 88 to develop a linear sweep as shown by the waveform 116 during the range interval $R_{MIN}$ to $R_{MAX}$, which sweep voltage and an inverted linear sweep of the waveform 118 are respectively applied to the deflection plates 101 and 102. Thus, over the range interval to be mapped, the pulse trains such as the waveform 391 developed from the IF signal of the waveform 390 and varying in polarity and amplitude to include doppler information similar to that of the waveform 388 of FIG. 3 controls the intensity of the electron beam of the record tube 98 as it scans along the range line 120. The electron beam is deflected vertically in synchronism with the time of return of the information from various ranges between ranges $R_{MIN}$ and $R_{MAX}$ of objects to be mapped such as the target 360. During each of a plurality of vertical sweeps such as indicated by a line 392 on the film 134, pulses such as of the waveform 391 applied to the intensity grid of the tube 98, increase and decrease the intensity of the electron beam to record the doppler frequency as a variation of intensity around a grey level. For purposes of illustration in FIG. 1, these intensity variations are indicated at the peak amplitude of their doppler modulation by the dots 158 on the film 134. In order that both positive and negative pulses can be recorded, the record tube 98 electron beam is adjusted so that zero signal input results in an intermediate level of beam current. The amplitude of the pulse of the waveform 391 resulting from the reflectivity of the point object 360 modulates both upward and downward the intensity of the electron beam of the tube 98. During the occurrence of each range interval as determined by the waveform 88, a separate vertical deflection of the line 120 develops an adjacent vertical deflection path on the storage film 134 similar to the line 392 because of the movement of the film 134. Thus, as the storage film 134 continues to move in the direction of the arrow 138, pulses having the cyclic amplitude and polarity variations of the waveform 388 are recorded thereon indicative of the doppler frequency. It is to be noted that the intensity variations depicted by the dots 158 are illustrated for only one point target at one range interval. However, in addition other targets at other range intervals and other targets at the same range interval may record similar intensity variations during each vertical sweep indicated by the line 392.

Figure 5:
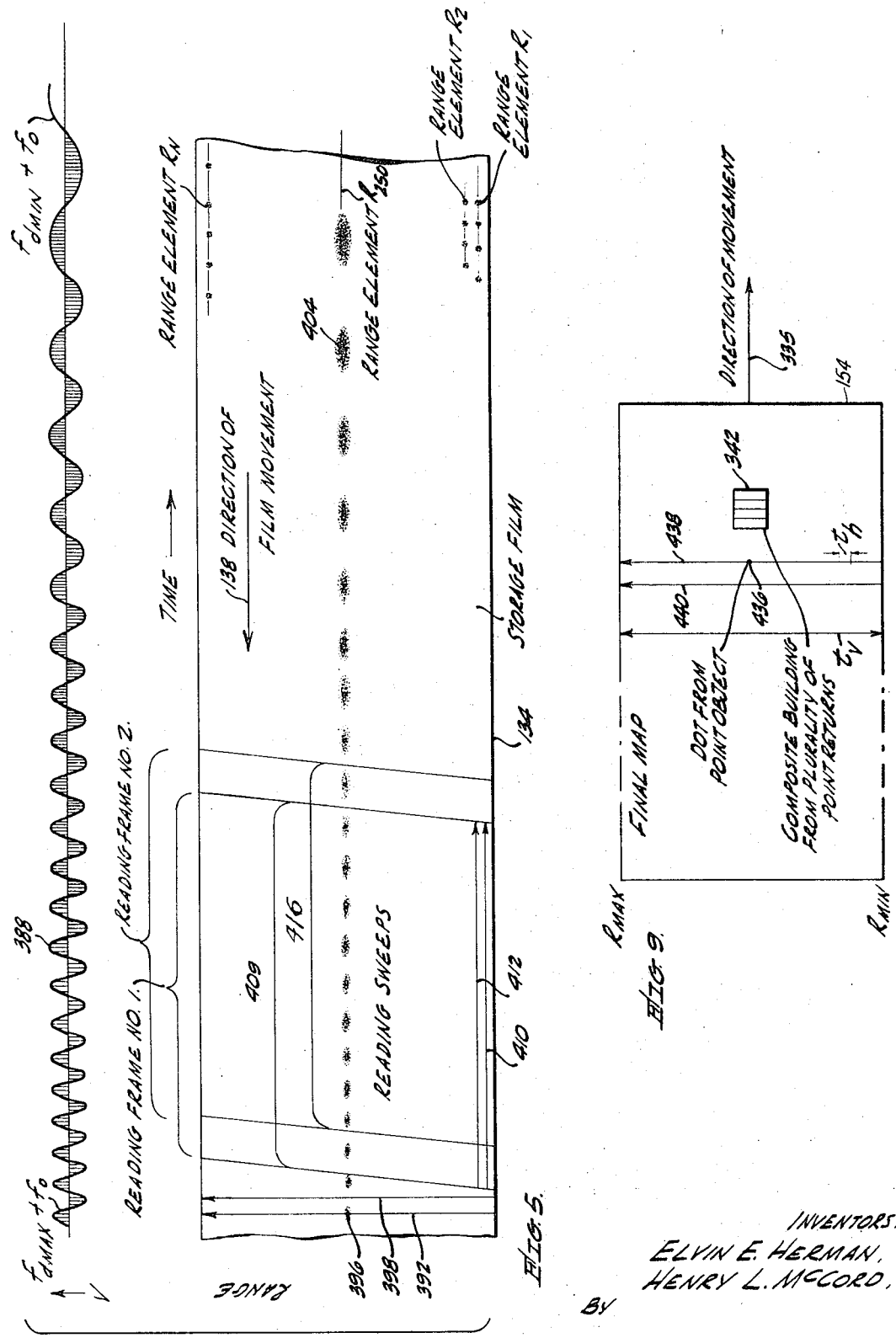
FIG. 5 is a schematic diagram of a portion of the recording film for explaining the recording and reading of doppler information over a selected range relative to the position of the craft for the system of FIGS. 1 and 2.

Referring now to FIG. 5 as well as to FIGS. 1 through 4, the recording operation will be explained in further detail, primarily considering the doppler envelope component of the waveform 388 developed from the single point target 360. It is to be again noted that the signal of the waveform 388 is an envelope representing the pulse train resulting from the phase relation of the offset IF reference signal to the pulsed signal derived from the point target 360. Along the vertical sweep line 392 (FIG. 5) during the first trace, amplitude variations of video pulses on the lead 95 of the waveform 391 (FIG. 4) are indicated by the envelope of the waveform 388. Thus, at a range element $R_{250}$ which represents the range of the point target 360 of FIG. 3, there is recorded on film 134 a sinusoidal variation in film density corresponding to the change of phase of the echo return relative to the coherent reference.

For convenience of illustration, the sinusoidal variations on the film 134 of FIG. 5 are shown as a series of dots such as dot 396 on vertical trace 392. These dots depict in the illustration the points corresponding to the peaks of the doppler modulation. As discussed above, the sinusoidal variations such as at the range element $R_{250}$ are formed from a plurality of pulses having an amplitude varying at the doppler frequencies as shown by the waveform 391. At the lower peak of the waveform 388 the intensity of the electron beam of the tube 98 is greatly decreased so that minimum film exposure is produced such as at the position of the range element $R_{250}$ during a later sweep indicated by a line 398. Successive vertical sweeps of the line 392 and those following are continuous, each occurring during a pulse interval of the waveform 36. In practice since it is the doppler components that are to be read out of the film 134 and not the individual pulses, it is necessary to advance film 134 at a rate sufficient only to resolve the highest doppler component of interest. Because the film travel is uniform, the lower frequency end of the doppler signal history of the waveform 388 causes the peak amplitudes of the sinusoidal variations in recorded film density such as indicated at dot 404 to be spaced at greater distances along the range interval $R_{250}$. The sinusoidal variations in optical transmissivity of the film 134 along range element $R_{250}$ are the direct result of recording the time history of this echo where its heterodyned bi-polarity video has been varied in output as shown in the waveform 388. When the time history of range element $R_{250}$ is read out, the photomultiplier tube 175 will respond by developing a linearly varying frequency sine wave output. It is the time and amplitude history of the doppler information indicated by the waveform 388 as well as other doppler signals from other objects which determines the transmissivity of the film along the range element $R_{250}$ and, as will be number 1 of FIG. 5. If the above-described range focus correction were not applied, the resolution of the system would vary somewhat for targets not at the exact range of focus because of the variation of the slope of the doppler signals as indicated graphically by lines 422, 423 and 424. However, the resolution varies only a small amount if the range of interest $R_{MIN}$ to $R_{MAX}$ is a very small percentage of the distance from antenna 12 to $R_{MAX}$.

The horizontal sweep voltage of the waveform 216 (FIG. 6) is modulated in slope in the variable gain amplifier 275 by the vertical sweep voltage of the waveform 232. The resulting slope-modulated horizontal sweep waveform is applied to reactance tube 274 which in turn controls the frequency sweep of the oscillator 268. The signal on the lead 270 during each horizontal sweep indicated by the lines 410 and 412 of FIG. 5 has a slightly different frequency versus time slope as controlled by the vertical sweep voltage of the waveform 232. Thus, during each horizontal sweep of the reading frame, such as frame number 1 of FIG. 5, the reference signal on the lead 270 is applied to the mixer 264 with a frequency varying at the same rate as the doppler history of any target which lies within the angular correlation zone and within the range being sampled.

Now considering only the doppler history from a single point target of range element $R_{250}$ as graphically shown by line 422 in FIG. 7, the difference frequency developed on the lead 278 (FIG. 2) is constant during the horizontal sweep on which it is read in each scanning frame, but since each successive complete scanning frame examines a later time segment of doppler histories, the difference frequency varies between successive scanning frames. Thus, the reference signal of the swept oscillator as depicted by line 414 at a time $t_{250}$ is compared with a portion of the doppler history or the sampled information of the line 422 representative of the information of a point target recorded in the range element $R_{250}$ only once during each reading frame, such as indicated by frame number 1 of FIG. 5. This comparison develops a difference signal on the lead 278 with a frequency $\Delta f_1$. Also, at frame number 2 time, $t_{250} + t_f$ where $t_f$ is the time interval to perform the total number of horizontal sweeps of a reading frame, the swept oscillator 269 compares a signal indicated by a line 426 to a portion of the doppler history of the line 422 of the same point target 360 to develop a difference signal having a frequency $\Delta f_2$. Thus, each comparison of the swept reference signal with the sampled signal history occurs during a later time interval of its doppler history or in other words further along the line 422. Therefore, this comparison continues for different portions of the doppler history of the single point target at range $R_{250}$ that is later along line 422 until in response to a reference signal excursion, line 427, at a time $t_{250} + mt_f$, where $m$ is the reading frame number, a signal having a difference frequency $\Delta f_D$ is applied to the lead 278 from the mixer 264. As opposed to other values of the difference signals, the difference frequency $\Delta f_D$ falls within the pass band of the filter 288 which has a narrow frequency response centered at this absolute frequency so that only during one or perhaps two or three horizontal sweeps near the time $t_{250} + mt_f$ is a translated doppler signal heterodyned to a frequency which will integrate, or build up, in amplitude to its maximum value in the tuned filter. The signal level in the filter is detected by the envelope detector 316 and will provide maximum output at the end of the integration interval $t_h$ in response to the sampling of the doppler history 422 at the time $t_{250} + mt_f$.

Although the comparison of the doppler history of the line 422 for the single point target 360 occurs only once during each frame of the read scanning tube 170, a similar comparison of other recorded doppler information occurs during each horizontal sweep as indicated by lines 410 and 412 of FIG. 5. Also, during each horizontal sweep many comparisons are simultaneously made because many doppler histories are recorded in each range element such as $R_{250}$ because of obtaining reflections from a plurality of points on objects being mapped.

To further consider information recorded at other range elements of the storage film 134, such as the doppler history depicted by the line 423 and derived from stored information in the range element $R_1$ of FIG. 5 and the doppler history depicted by the line 424 and derived from stored information in the range element $R_n$, a similar comparison is made in the mixer 264 between the swept reference signal and the sampled information. To accomplish focusing at all ranges over a time interval of a complete reading frame, as the range being sampled varies between $R_{MIN}$ and $R_{MAX}$, the slope of the reference signal on the lead 270 varies between that of a reference signal 428 and 429 to compare with the frequency slope of that range. Similar to the discussion above, when the frequency of the difference signal developed by the comparison of the reference signal of the line 428 with the sampled information of the line 423 (at range $R_1$) equals the frequency $\Delta f_D$, the difference signal at an absolute frequency $\Delta f_D$ passes through the filter 288 indicating that the sampled information was derived from a target at minimum range broadside to the position of the craft. Also, when the frequency of the difference signals developed by the comparison of the reference signal at each sequential range up to $R_N$ or $R_{MAX}$ with the sampled information of doppler histories recorded at sequential range element up to $R_N$ equals the frequency $\Delta f_D$, the difference signal passes through the filter 288 indicating that the sampled information was derived from a target broadside to the craft at a corresponding range. It is to be noted that the frequencies $f_{S1}$ and $f_{S2}$ are defined respectively as $(\rho f'_{DMS\ 1} + \Delta f_D)$ and $(\rho f'_{DMS\ 2} + \Delta f_D)$ where $\rho$ is the overall scale factor and corresponds to the ratio of the doppler input rate onto the film to the readout rate. Thus, doppler information recorded on the storage film 134 is sequentially sampled in increasing range elements during each frame and compared with a reference signal varying in a frequency versus time slope in a similar manner to the doppler history. This variation of the slope provides electronic focusing at all ranges to the synthetic antenna array developed by the system in accordance with this invention. The difference signal developed by the mixer 264 is then compared with the pass band of the filter 288 which is tuned to a selected frequency $\Delta f_D$. The frequency $\Delta f_D$ is chosen to lie outside the frequency of excursion of the programmed swept oscillator and also outside the readout (illuminated) target offset doppler frequency explained subsequently, which determines the point-to-point intensity of each picture element on the final map. It is to be noted that doppler signals from other point targets may be recorded along the range element $R_{250}$ but the photomultiplier tube 175 responds to develop a composite signal which contains the spectral components of each recorded doppler signal. The amplitude of the signal of the waveform 388 is shown constant for convenience of illustration but in practice it will vary in amplitude proportional to the reflectivity of that object and in accordance with the antenna 12 illumination pattern as the craft moves forward. Thus, both the reflectivity of an object being mapped and the position relative to the moving craft are recorded on the intermediate or storage film 134.

Figure 6:
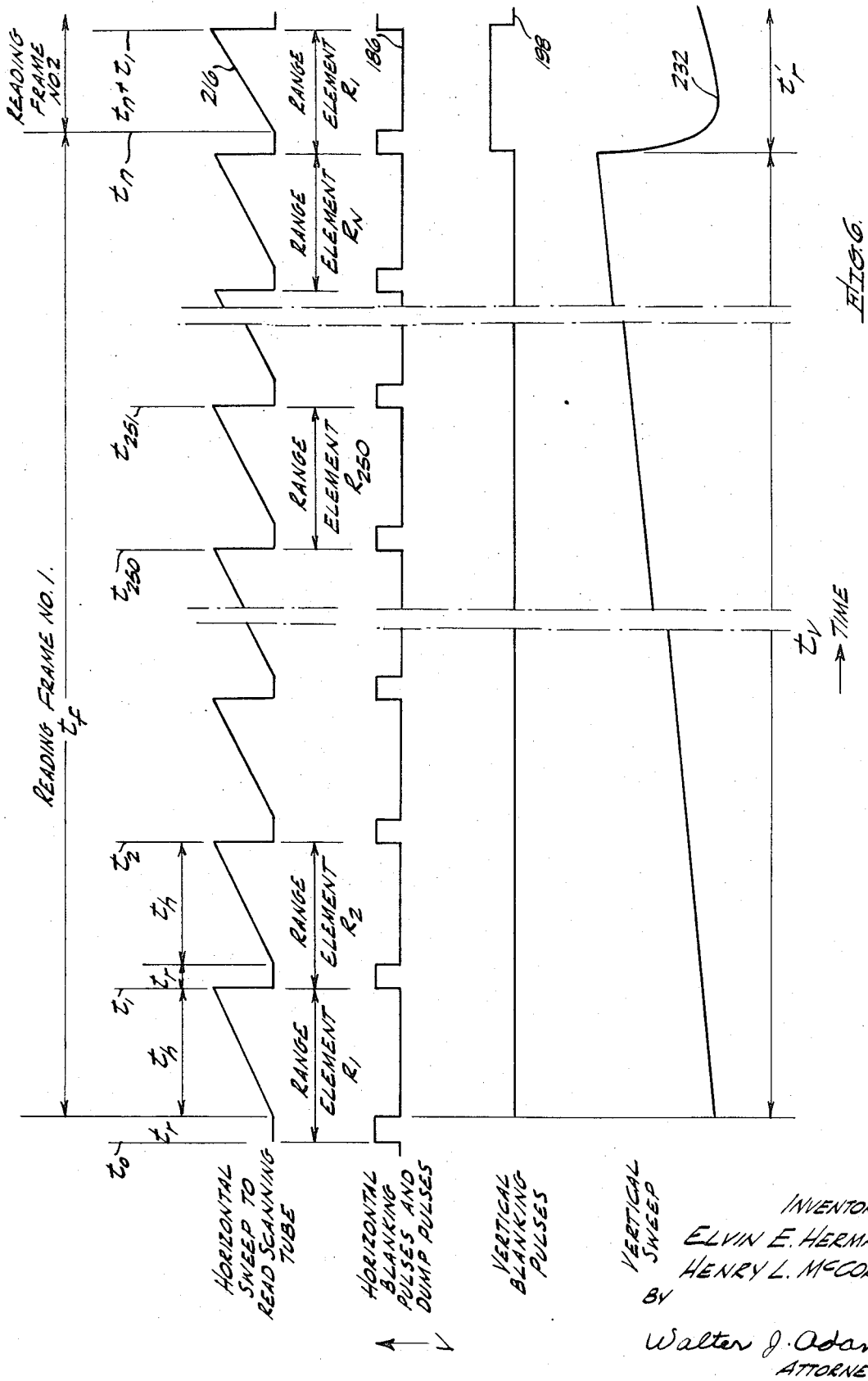
FIG. 6 is a diagram of waveforms of time versus voltage for explaining the reading and displaying operation of the system of FIGS. 1 and 2.

Now that the recording of the doppler history on the film 134 has been explained, the sequential processing operation will be further explained by referring to the waveforms of FIG. 6 as well as to FIGS. 1, 2 and 5. The programmer 178 of FIG. 2 controls the read scanning tube 170 of FIG. 1 so as to sequentially illuminate or sample a portion of the doppler information recorded and photographically developed on the storage film 134. During a reading frame number 1 indicated by a scanning area or raster 409 (FIG. 5), the horizontal sweep signal of the waveform 216 (FIG. 6) continues from time to $t_o$ to $t_n$ with each sweep continuing for the horizontal correlation time $t_h$ followed by a short time interval $t_r$ for retrace. For example, between times $(t_o + t_r)$ and $t_1$, information is read from a range element $R_1$ by a horizontal sweep indicated by a line 410 (FIG. 5) and between the times $(t_1 + t_r)$ and $t_2$ the information recorded on the range element $R_2$ is read by horizontal sweep indicated by a line 412. This sequential sampling continues during the reading of frame or raster number 1 over the range elements $R_1$ to $R_n$ so as to sample or interrogate the doppler histories of each of the range elements. The sinusoidal variations in transmissivity of the recorded film corresponding to doppler histories as illustrated by dot 158 (FIG. 1) or by dot 396 (FIG. 5) are sensed by the photomultiplier tube 175 to develop a signal similar to the waveform envelope 388 but translated up to a much higher frequency due to the rapid readout rate. At the termination of the raster indicated by the area 409 as controlled by the vertical sweep signal of the waveform 232, a second frame or raster indicated by the area 416 is initiated to again sequentially read the range elements $R_1$ to $R_n$ so that a later segment of the time history of each range element is sampled and sensed by the photomultiplier tube 175. During the time of the retrace of the tube 170 at the end of each horizontal sweep of the waveform 216, the electron beam is blanked to prevent a signal from being sensed by the photomultiplier tube 175 during this retrace interval. Horizontal blanking pulses of the waveform 186 are applied through the lead 200 and resistor 202 to the cathode of the read scanning tube 170 to prevent a retrace being developed on the screen during each horizontal sweep. Also, to eliminate the retrace of the vertical sweep between the frames such as the reading frames 1 and 2, vertical blanking pulses of the waveform 198 are applied through the summing resistor 206 to the cathode of the read scanning tube 170.

The sampled doppler information signal sensed by the photomultiplier tube 175 during each horizontal sweep of waveform 216 has a frequency variation corresponding to each target's original doppler history as it appeared during recording on the lead 84. Because the doppler history is read out in a time interval $t_h$ which is much shorter than the corresponding time interval during which it was recorded, the readout doppler frequency history is multiplied by a frequency scale factor. This output signal after being amplified in video amplifier 260 is applied to the mixer 264 for being compared with a programmed reference signal developed by the swept oscillator 269. After being mixed with the programmed swept reference signal, the read-out doppler signals are appropriately selected in a tuned filter to provide outputs from objects or targets when their doppler histories pass through the point where they are heterodyned to fall within the pass band of the tuned filter 288. This point corresponds to a very narrow angular zone, fixed relative to the velocity vector of the craft 354 of FIG. 3, and represents the angular correlation zone.

Figure 7:
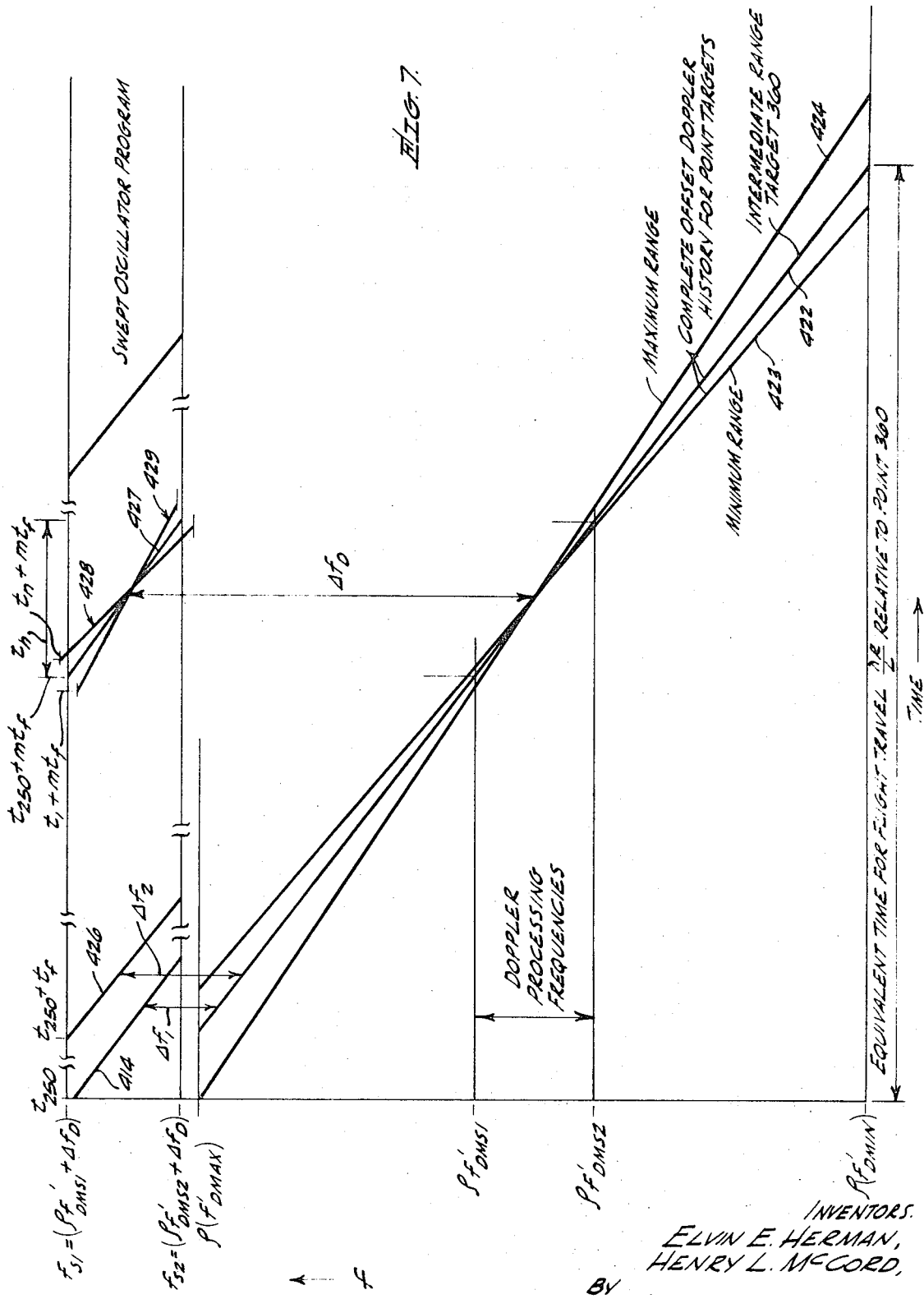
FIG. 7 is a schematic graph of frequency versus time for explaining the operation of the system of FIGS. 1 and 2 to develop a focused synthetic antenna array.

Referring now to FIG. 7, as well as to FIGS. 1 and 2, for explaining the operation of the swept oscillator 269, a line 422 graphically represents the frequency variation or the doppler history versus time on the lead 262 (FIG. 2) for the point target 360 resulting from sampling of the recorded waveform 388 of FIG. 3. A line 423 indicates the frequency variation of the doppler history signal on the lead 262 received from a point target (not shown) at the minimum range $R_{MIN}$ on the line 372 of FIG. 3 and a line 424 indicates the frequency variation of the doppler history received from a point target (not shown) at the maximum range $R_{MAX}$ on the line 372. As shown in FIG. 3, the shorter the range of a point target, the shorter is the time of illumination of the point target by the antenna main lobe such as 374 because of the angular coverage pattern $\theta$ of the antenna 12, and the longer the range, the longer is the time of illumination of the point target. Thus, for the minimum range $R_{MIN}$ the useful doppler return from a target occurs during a shorter interval of time than for the maximum range $R_{MAX}$. However, at the shorter range the doppler frequency varies at a greater rate than at a longer range. As a result, this variation in total duration of recorded doppler history of each point target at different ranges does not adversely affect the comparison operation of this system. In order to record a point target such as 360 on the final map 154 at the proper position along the flight path, the swept oscillator 269 which develops the swept reference signal is programmed so that when read scanning tube 170 is horizontally scanning doppler histories at intermediate range, the swept oscillator varies over a selected frequency interval $f_{s1}$ to $f_{s2}$. Thus, in general the frequency varying sampled doppler history is compared with the reference swept frequency signal to develop a difference signal which is then compared with the passband of the filter 288. However, as discussed above, the target histories of objects at each range between $R_{MIN}$ and $R_{MAX}$ have a different frequency versus time slope. Therefore, electronic focusing at all ranges between $R_{MIN}$ and $R_{MAX}$ is provided by including the variable gain amplifier 275 (FIG. 2) to vary the frequency versus time slope of the reference signal applied to the mixer 264 on the lead 270 as the range being sampled varies during each reading frame such as during frame range. Within the principles of this invention it should be noted that the doppler information can be sequentially sampled in decreasing range sequence providing that a corresponding variation of the reference signal slope is programmed and that the doppler history can be scanned in reverse direction.

In order that at the termination of each horizontal sweep indicated by the lines 410 and 412 of FIG. 5, the filter 288 will be rapidly discharged, the pulsed signals of the waveform 186 (FIG. 6) are applied to the dumping circuit 292 to bias the transistors 290 and 294 into conduction and short out the capacitor 284 and inductor 286. It is to be again noted that the doppler history for the point target 360 and for the targets at minimum and at maximum range indicated by the lines 422, 423 and 424 are only for single point objects and that for a plurality of points and objects the operation is similar as described.

Figure 8:
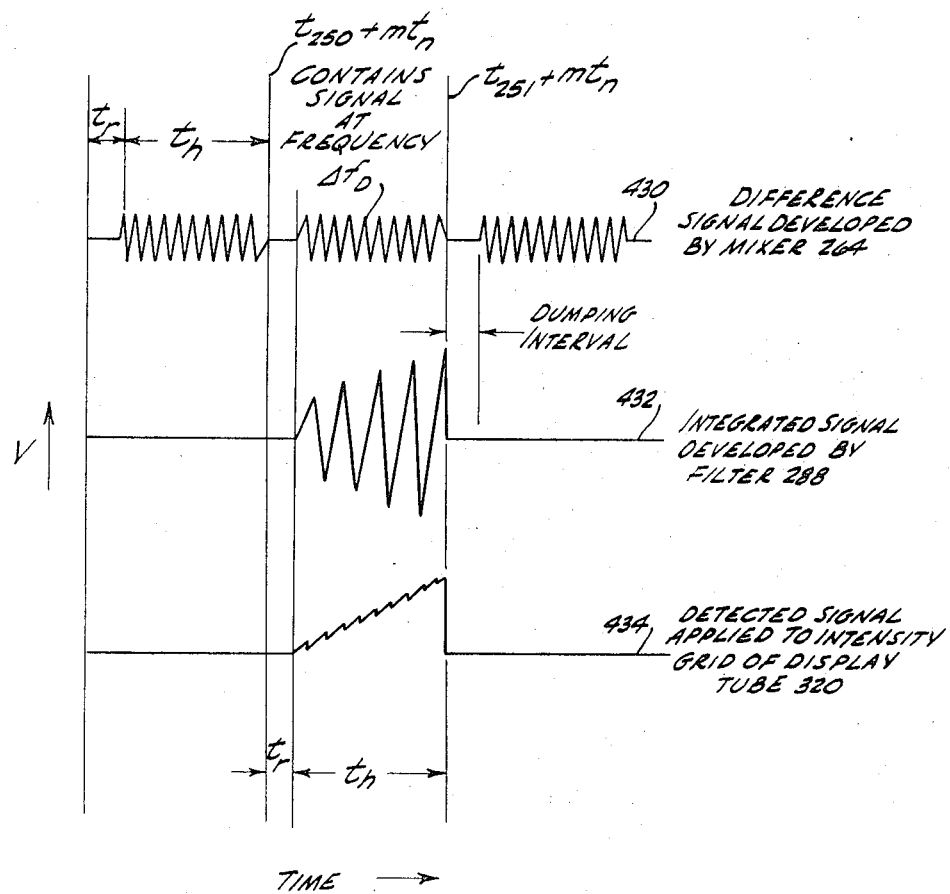
FIG. 8 is a diagram of waveforms of time versus voltage for explaining the comparison operation of the filter of FIG. 2.

To further explain the operation of the filter 288, the difference signal on the lead 278 is shown by a waveform 430 of FIG. 8. The signal on the lead 283 is shown by a waveform 432 of FIG. 8. At time $t_{250} + mt_f$ the comparison of the reference signal 427 of FIG. 7 and the doppler history of the line 422 develops a difference signal of an absolute frequency $\Delta f_D$. Thus, energy is applied at the resonant frequency of the tuned circuit filter 288 made up of capacitor 284 and inductor 286. This sinusoidal waveform at the difference frequency $\Delta f_D$ is integrated developing the signal of the waveform 432 on the leads 283 and 314 between the times $t_{250} + mt_f$ and $t_{251} + mt_f$. The signal of the waveform 432 results from sampled information derived from a single point target which has passed through a broadside position relative to the flight path of the craft. The integrated signal of the waveform 432 is then applied to the envelope detector 316 to develop a detected signal of a waveform 434 during the interval $t_h$, which detected signal after amplification in the amplifier 318 is applied to the intensity grid of the display tube 320 for developing an electron beam. It is to be noted that the voltage on the lead 319 in combination with the cathode bias is normally at a level to maintain the tube 320 at cutoff. Thus, during the interval after $t_{250} + mt_f$, the tube 320 has brightened and exposed a point on the map 154 indicative of the presence of a target such as the point target 360. When at resonance the slope and therefore the maximum level of the detected signal of the waveform 434 is proportional to the amplitude of the difference signal of the waveform 430 which in turn is proportional to the reflectivity of the point object. The display recording tube 320 has vertical deflection plates 322 and 324 controlled by the vertical sweep voltages of the waveform 236 and 232 so that the information is recorded along a range dimension varying from $R_{MIN}$ to $R_{MAX}$, that is, $R_1$ to $R_n$, arranged vertically on the map 154. The reflectivity of an object being mapped and its angular position relative to the craft determines the slope and the final amplitude of the detected waveform 434, and this in turn determines the final intensity of the electron beam of tube 320 as discussed above. The doppler history signals such as the waveform 388 (FIG. 3) have an amplitude determined by the reflectivity of the objects being mapped which determines the intensity of recording on the storage film 134 as illustrated by the dots on the figure. The amplitude of the sampled signal applied to the mixer 264 is proportional to the amplitude of the waveform 388. The amplitude of the output difference signal of the waveform 430 on the lead 278 is directly proportional to the input sampled signal level. This output difference signal amplitude as well as its frequency in turn determines the slope of the detected signal of the waveform 434 applied to the intensity grid of the tube 320. In order to eliminate retrace signals, the vertical pulsed signal of the waveform 198 is applied to the cathode of the tube 320. The dot 436 which represents an unexposed point on the film 154 is then passed through the developing tank 344 to form a dark element on the final map 154.

Referring now to FIG. 9 as well as to FIGS. 1, 2 and 7, the final map 154 will be further explained. The vertical sweep of the electron beam of the tube 320 is continuous on the map 154 as indicated by lines 438 and 440, each line requiring a time interval $t_v$. Thus, as indicated on the line 438 each small portion or element represents a time $t_h$ during which correlation of the frequency of the swept oscillator 269 and the frequency of the sampled doppler history is performed at a difference range interval. When a difference frequency $\Delta f_D$ energizes the filter 288, an object is recorded on the map 154. As the map 154 continuously moves in a direction indicated by the arrow 335, the horizontal position represents the azimuth of the area being mapped and the vertical position on the map 154 represents the range position between $R_{MIN}$ and $R_{MAX}$. The point target 360 of FIG. 3 thus develops the point 436 on the map 154 and the large target 362 develops the indication 342 on the map 154. As discussed above, the reflectivity of the targets 360 and 362 determines the degree of exposure of the recorded indications 342 and 436. It is to be noted that the target elements 342 and 436 on the map 154 are only an example of the many representations that are developed from an area being mapped.

The mapping system in accordance with this invention thus develops a focused synthetic antenna array having a length L resulting from utilization of target doppler histories over a portion of length of craft movement during which the radar returns from objects are recorded as their amplitudes and phases vary in response to the movement of the craft 354 as shown in FIG. 3. The portion of the total recorded doppler history equivalent to the length L (FIG. 3), over which the doppler history is selected, is sampled and compared with the reference signal to determine the relative position of the craft and the target when the information was being recorded. Because of the focused synthetic array, which is approximately equivalent to an antenna having a length L, a high degree of azimuth resolution objects being mapped is obtained. Since this system can also be operated at infinity focus as mentioned earlier and in order to compare all-range-focusing versus infinity focus their relative azimuth resolutions will be considered.

If an infinity focused (or as sometimes called unfocused) synthetic array is formed, then letting $D$ be the resolution distance at the point 360 of FIG. 3 in a direction parallel to the flight path 358, the resolution for the infinity or unfocused antenna may be expressed as:

$$D = L + R\lambda/L$$

where $R$ is the range in FIG. 3 from the craft 354 and the point target 360 and $\lambda$ is the wave length of the transmitted RF frequency. It can be seen that the resolution distance $D$ is thus limited for the unfocused antenna.

As was explained, the system in accordance with this invention provides electronic focusing in azimuth by linearly sweeping the frequency of oscillator 268 during each range element readout. Focusing at all ranges is further provided (when required) by controlling the slope of this oscillator frequency excursion as a function of range. Thus, through all-range focusing a very small resolution distance may be obtained as shown by the following equation for a focused antenna:

$$D = R\lambda/L$$

when $R \geq eL/\lambda$ where $l$ is the length of the transmitting antenna 12 (FIG. 3).

Thus, by increasing the distance $L$ over which each target doppler history is processed, a large synthetic equivalent antenna length is achieved, hence a very high resolution map may be developed. It is to be noted that if the data from the real antenna 12 of the craft 354 were displayed directly without synthetic array processing then the azimuth resolution distance $D$ is approximately equal to $R\lambda/l$ where $l$ is the physical length of antenna 12. Because of the greater degree of correlation possible, the longer the sample length of processed doppler history the greater the resolution up to the point where the resolution distance $D$ approaches the real antenna length. Thus, for maximum resolution of objects, the doppler history interval processed $f'_{DMS\,1}$ to $f'_{DMS\,2}$ (FIG. 3) in response to a point at intermediate range may be selected equal to the frequency range $f_D'_{MAX}$ to $f_D'_{MIN}$ which represents the maximum doppler excursion over which the target is illuminated.

Now that the operation of the system in accordance with this invention has been explained, an example will be given to further explain the high azimuth resolution thereof. The following example is chosen to provide a 10 feet null-to-null resolution distance $D$, that is, two objects at least 10 feet apart near the point target 360 of FIG. 3 in a direction parallel to the flight path 358 are distinguishable. The range $R$ between the flight path 358 and the point target 360 is 10 nautical miles or approximately 60,000 feet which is the intermediate range of $R_{MIN}$ and $R_{MAX}$. The frequency of the RF signal transmitted of the waveform 36 (FIGS. 1 and 4) will be selected in the X-band region so that the wave length $\lambda$ is equal to 0.1 feet. The pulse repetition frequency (PRF) of the waveform 36 of FIG. 4 is selected as 2KC because of considerations mentioned below. The maximum PRF is determined by unambiguous range considerations and average power requirements. The minimum PRF is set so as to minimize spurious angular lobes or ambiguities, that is, the PRF must be set sufficiently high that target doppler components arising within the main antenna illumination pattern are sampled at least twice per doppler sine wave. The length $L$ of the synthetic array developed by the system is derived from:

$$L = R\lambda/D = 60{,}000\,(0.1)/10 = 600 \text{ feet}$$

The constant velocity of the aircraft $v_a$ is selected as 300 feet/second. Thus, the time to gather information $t_a$, that is, to fly an equivalent synthetic array or length $L$, is $t_a = L/v_a = 600/300 = 2.0$ sec. per array length. Stated differently $t_a$ represents the interval of doppler history to be read out and processed at the 10 mile range. In reading out the recorded doppler history interval or sampling, the time required per range element corresponding to an array length $L$ of information, $t_h$ the readout line duration, is selected as $53\mu$ seconds.

The system thus has a scale factor $\rho = t_a/t = 2.0/53 \times 10^{-6}$ sec. $= 37{,}800$. $\rho$ may also be defined as the time required to gather an array length of doppler information divided by the time required to process (read out) the same information.

Now to calculate the instantaneous doppler frequency $f_{DX}$ at any point $x$ distance at range $R$ off of broadside:

$$f_{DX} = 2v_a \sin \beta_x/\lambda$$

Where $\beta_x =$ the angle between a line broadside of the craft and a line from the craft to a particular object which is $x$ feet from broadside at a range $R$.

To determine the maximum doppler frequency of interest let $X = L/2$ and hence $\sin \beta_x = L/2R$.

At an azimuthal position corresponding to the end of the synthetic array, the maximum doppler processing frequencies occurs, i.e., these extremes correspond to the extreme values of the predetermined doppler history which must be processed to obtain the desired broadside resolution, D, and are:

$$f_{D\,MAX} \cong 2V_a/\mu \cdot L/2R = \pm 30 \text{ C.P.S.}$$

To avoid negative frequencies and to allow a clear spectral region to facilitate processing, the lowest negative doppler frequency obtained during the real antenna beam illumination must be offset so that it no longer reaches zero frequency. Assuming a physical antenna 12 (in FIG. 1) of 5 feet pointed exactly broadside, the null-to-null angular beamwidth of the real antenna is $2\cdot\lambda/l = 0.2/5 = 0.04$ radians or 2.29°. The maximum doppler frequency which would exist at the real antenna nulls would be $f_{D\,MAX} = 2V_a/\lambda \sin 1.14°$ or $\cong 120$ C.P.S. Thus, $f_{D\,MIN}$ of waveform 370 translates to $f_D'_{MIN}$ of waveform 388 where $f_D'_{MIN}$ and $f_D'_{MAX}$ are offset from $f_{D\,MIN}$ and $f_{D\,MAX}$ respectively by 120 cycles. All the real time instantaneous doppler frequencies incur the same shift, e.g., in FIG. 3, $f'_{DMS\,1} = f_{DMS\,1} + f_o = 150$ C.P.S. and $f'_{DMS\,2} = f_{DMS\,2} + f_o = 90$ C.P.S. where $f_o = 120$ C.P.S. ($f_{DMS\,1} = 30$ C.P.S. and $f_{DMS\,2} = -30$ C.P.S.) in this case.

In read out, due to the sequential method of processing, the above instantaneous real time, doppler frequencies are translated by the scale factor $\rho$, and are now:

$$\rho f'_{DMS\,1} = \rho(150) = 5.670 \text{ m.c.}$$

$$\rho f'_{DMS\,2} = \rho(90) = 3.402 \text{ m.c.}$$

The oscillator program is now determined to have a frequency range $f_{S1}$ to $f_{S2}$ from $(5.670 + \Delta f_D)$ MC to $(3.402 + \Delta f_D)$ MC where $\Delta f_D$ is the absolute center frequency of the pass band of the filter 288 of FIG. 2. In order to minimize spurious angular responses, those read out doppler components lying beyond $f'_{DMS\ 1}$ and $f'_{DMS\ 2}$ will be filtered out in the video amplifier 260. If $\Delta f_D$ is chosen as 2.5MC, the program of the swept oscillator 269 of FIG. 2 varies between $f_{S1} = 8.170$MC to $f_{S2} = 5.902$MC.

The vertical deflection time $t_v$ required to develop each frame of FIG. 5 during reading from the storage film 134 is determined from the consideration of the sampling theory that to resolve a distance $D$, the recorded information must be sampled every $D/2$ equivalent feet on the film 134. Each frame such as shown by the area 409 of FIG. 5 must be completed before the film 134 moves an equivalent distance of $D/2$ feet.

Thus, $(t_v + t_r') = D/2v_a = 0.0167$ seconds which includes the flyback time $t_r'$ of the waveform 232 of FIG. 6.

The speed $v_f$ of the film 134 of FIG. 5 is dependent on a number of factors including vehicle speed and resolution and may be selected as 0.33 inch/second. At this film transport rate the film will have advanced 0.0055 inches between frames such as indicated by the areas 409 and 416 of FIG. 5. At this film advance rate the spacing between successive sine waves of the maximum recorded doppler component to be processed ($f'_{DMS\ 1} = 150$ C.P.S.) is equal to 0.0022 inches. It is to be noted that although the resolution $D$ with the specific parameters chosen in the above example was selected as 10 feet, the system in accordance with this invention is capable of an even higher degree of azimuth resolution.

Thus, there has been described a mapping system for use from a moving craft that provides a high degree of azimuth resolution to objects being mapped. Because a high degree of range resolution is available from other radar techniques, a highly detailed map is obtained of a selected area to be mapped. For a given physical antenna size, the system improves azimuth resolution over that obtainable with direct display of recording of the radar output by developing a synthetic antenna array having a length determined by the azimuth resolution required and by providing a swept oscillator to compensate for the phase rotation of the radar returns as the path length varies so as to develop mapping information with electronic all-range-focusing. The processing is sequential so as to minimize the complexity and weight of the system. Because a synthetic antenna is developed a relatively small physical size antenna may be employed and an aircraft may travel at a high velocity without affecting the aerodynamic operation thereof. The system, in accordance with this invention, allows reliable mapping of a surface area such as of the earth regardless of atmospheric conditions.

What is claimed is:

1. A mapping system comprising coherent radar means for developing doppler signals representative of position of an object to be mapped, recording means coupled to said radar means for storing said doppler signals, reading means coupled to said recording means to develop information signals, mixing means coupled to said reading means, oscillator means coupled to said mixing means for developing a frequency varying signal, said mixing means developing a difference frequency signal, filter means coupled to said mixing means to pass said difference frequency signal at a selected frequency, signal forming means coupled to said filter means for developing a signal in response to said difference frequency signal being past through said filter means, and map forming means coupled to said signal forming means for developing an indication of said object to be mapped.

2. A mapping system comprising signal forming means for developing doppler signals having frequency and relative time characteristics representative of position respectively in a first and a second dimension of an object to be mapped, recording means coupled to said signal forming means for storing said doppler signals, reading means coupled to said recording means to develop information signals from the stored doppler signals, mixing means coupled to said reading means, oscillator means coupled to said mixing means for applying a reference signal having preselected frequency characteristics, said mixing means developing a difference frequency signal, filter means coupled to said mixing means to pass said difference frequency signal at a selected frequency representative of said first dimension, and map forming means coupled to said signal forming means and to said reading means to respond in said second dimension for developing an indication of said object to be mapped.

3. A synthetic array system operable from a craft moving relative to objects to be indicated over a range interval from the craft comprising radar means mounted on the craft to illuminate the objects and develop doppler history signals therefrom as the craft moves, recording means coupled to said radar means for storing the doppler history signals in range elements, reading means coupled to said recording means, programming means coupled to said reading means to control said reading means to sequentially sample the doppler history signals in each range element, first comparison means coupled to said reading means and to said programming means for comparing the frequency of the sampled doppler history with the frequency of a reference signal to develop a difference signal, second comparison means coupled to said first comparison means for comparing the frequency of said difference signal with a fixed frequency, display means coupled to said second comparison means, to said reading means and to said programming means for providing an indication of said objects.

4. A system operable from a craft moving past point objects for developing indications of the objects over a selected range interval from the craft comprising radar means mounted on said craft for developing doppler signals of varying frequency in response to energy intercepted from each object while being illuminated by said radar means, storage means coupled to said radar means for recording the doppler signals in range elements as the craft moves, reading means coupled to said storage means, programming means coupled to said reading means for sequentially sampling the doppler signals in each range element to develop sampled signals indicative of the frequency variation of the doppler signals, comparison means coupled to said reading means, reference means coupled to said programming means and to said comparison means for applying a reference signal of varying frequency to be compared with said sampled signals to develop difference signals at said comparison means, filter means coupled to said comparison means for comparing the frequency of said difference signals with a predetermined frequency to develop a signal indicative of the presence of objects at a fixed angle relative to the flight path of said craft, detecting means coupled to said filter means for developing a detected signal, and display means coupled to said programming means, to said reading means and to said detecting means for developing an indication of the point objects over said range intervals as said craft moves along said flight path.

5. A mapping system comprising radar means for developing doppler signals having frequency varying characteristics and time of occurrence characteristics representative of position of an object to be mapped, recording means coupled to said radar system for storing said doppler signals, reading means coupled to said recording means, programming means coupled to said reading means for controlling said reading means to read said doppler signals in a predetermined order to develop informational signals, mixing means coupled to said reading means, swept oscillator means coupled between said programming means and said mixing means for developing a frequency varying reference signal, said mixing means developing a difference frequency signal, filter means coupled to said mixing means to pass said difference frequency signal at only a selected frequency, detecting means coupled to said filter means for developing a signal in response to said difference frequency signal being passed through said filter means, and map forming means coupled to said detecting means to said reading means and to said programming means for developing an indication of said object to be mapped.

6. A synthetic array system operable from a craft moving relative to objects in a range interval from the craft comprising a coherent transmitter and receiver mounted on the craft to illuminate the object and receive doppler history signals therefrom as the craft moves, recording means coupled to said receiver for storing the doppler history signals in range elements, reading means coupled to said recording means, programming means coupled to said reading means to control said reading means to sequentially sample the doppler history signals in each range element, comparison means coupled to said reading means and to said programming means for comparing the frequency of the sampled doppler history with the frequency of a reference signal to develop difference signals, filter means coupled to said comparison means for comparing the frequency of said difference signals with a fixed frequency, detecting means coupled to said filter means for developing detected signals, and display means coupled to said detecting means and to said programming means for providing an indication of said objects.

7. A synthetic array system operable from a craft moving past point objects for developing indications of the objects over a range interval comprising radar means mounted on said craft for intercepting doppler signals of varying frequency from each object while being illuminated by said radar means, frequency shifting means coupled to radar means for shifting said doppler signals, storage means coupled to said frequency shifting means for recording the shifted doppler signals in range elements as the craft moves, reading means coupled to said storage means, programming means coupled to said reading means for controlling said reading means to sequentially sample the doppler signals in each range element and to develop sampling signals representative of the frequency variation of the doppler signals, comparison means coupled to said reading means, reference means coupled to said programming means and to said comparison means for controlling said comparison means to compare a reference signal of varying frequency with said sampling signals to develop difference signals, filter means coupled to said comparison means for comparing the frequency of said difference signals with a fixed frequency to develop a signal indicative of the presence of objects at a fixed angle relative to the flight path of said craft, and display means coupled to said programming means, to said reading means and to said filler means for developing an indication of the point objects over said range intervals as said craft moves along said flight path.

8. A system for sequentially processing stored doppler information signals having a frequency variation indicative of the position of objects in a first dimension and a time of occurrence indicative of the position of objects in a second dimension, said doppler information being stored on a storage means in said first and second dimensions comprising reading means coupled to said storage means, programming means coupled to said reading means for controlling said reading means to read a portion of said stored frequency in said first dimension sequentially over a predetermined number of elements in said second dimension to sequentially develop a plurality of signals at frequencies representative of the stored frequencies of each of said elements, mixing means coupled to said reading means, oscillator means coupled to said mixing means and to said programming means for developing a repetitive reference signal of varying frequency in synchronism with the reading in said first dimension, said mixing means developing signals having a frequency equal to the frequency difference between said signals developed by said reading means and said reference signal, filter means coupled to said mixing means having a pass band centered to pass the signals developed by said mixer at a predetermined difference frequency, detecting means coupled to said filter means for developing an envelope signal from the signals passed through said filter means, and map forming means coupled to said programming means, to said reading means and to said detecting means to provide a representation of the objects in said first and second dimensions.

9. A system for continually mapping an area in a selected range interval from a moving craft comprising a source of doppler signals having time and frequency characteristics indicative of the position of objects in the area, recording means coupled to said source of doppler signals for sequentially recording the doppler frequency of said doppler signals over the range interval, reading means coupled to said recording means, programming means coupled to said reading means for controlling said reading means to form continuous reading frames each sequentially reading a portion of the doppler information of the doppler signals at each of a plurality of predetermined range positions so as to sequentially form information signals from each doppler signal representative of the frequency variation thereof, a mixer coupled to said reading means, a swept oscillator coupled to said mixer and to said programming means for developing a comparison signal varying over a predetermined frequency range and in synchronism with the reading of each portion of the doppler information, said mixer developing correlation signals having frequencies equal to the difference of the recorded doppler signal and the comparison signal, a filter coupled to said mixer having a pass band centered at a predetermined frequency of said correlation signals detecting means coupled to said filter means for developing a control signal, and recording means coupled to said detecting means, to said reading means and to said programming means for responding to the time of reading said doppler information and to signals passed through said filter means to provide an indication of the position of the objects being mapped.

10. A focused mapping system operable to map a range interval from a craft moving in azimuth relative to objects being mapped including means for developing a plurality of frequency varying doppler signals having frequency and time characteristics representative of the position of the objects relative to the position of the moving craft and for recording in parallel the doppler signals over the range interval so that the information from each range forms a range element comprising reading means coupled to the recording means for scanning the recorded information, programming means coupled to said reading means for developing a first sweep signal having a duration so said scanning means scans a portion of a range element and for developing a second sweep signal so said scanning means sequentially and continually scans each range element for developing informational signals having frequencies proportional to the recorded doppler signals, mixing means coupled to said reading means, swept oscillator means coupled to said mixing means, variable gain means coupled to said swept oscillator means and said programming means to respond to said first and second sweep signals to continually develop a reference signal having a rate of change of frequency that varies during each of said first sweep signals to conform to the rate of change of frequency of said informational signals to provide focusing, said mixer developing a plurality of correlation signals having a difference frequency representative of azimuth position of said objects, filter means coupled to said mixing means for passing said correlation signals at a predetermined difference frequency, and recording means coupled to said filter means to said programming means and to said reading means for developing indications in range and azimuth of said objects in response to signals passed through said filter means.

11. A system operable to map a range interval from a craft moving in azimuth relative to objects being mapped comprising radar means for developing a plurality of doppler signals having frequency and time of occurrence characteristics representative of the position of the objects relative to the position of the moving craft, recording means coupled to said receiver for sequentially recording in parallel said doppler signals over the range interval so that the information from each range forms a range element, reading means coupled to said recording means for scanning the recorded information, programming means coupled to said reading means for developing a first sweep signal having a duration so said scanning means scans a portion of a range element and for developing a second sweep signal so said scanning means sequentially and continually scans a portion of each of said range elements for developing informational signals having frequencies proportional to the recorded doppler signals, mixing means coupled to said reading means, swept oscillator means coupled to said mixing means, oscillator control means coupled between said swept oscillator means and said programming means to respond to said first and second sweep signals to continually develop a reference signal having a frequency variation over a selected frequency range, said mixer developing correlation signals having a difference frequency representative of a predetermined azimuth position of said objects, filter means coupled to said mixing means for passing said correlation signals at a predetermined difference frequency, and recording means coupled to said filter means, to said programming means and to said reading means for developing indications of said objects in azimuth and range.

12. A system for providing focused mapping of objects in a range interval opposite a moving craft comprising pulsed coherent radar means having an antenna mounted on the side of said craft for illuminating said object being mapped and for obtaining doppler history signals of said objects being illuminated, said doppler history signals varying in frequency and having a zero frequency when said object is opposite said craft, offset oscillator means coupled to said radar means for shifting the frequency of said doppler history signals so that said zero frequency is at a selected frequency, an intermediate storage film moving with a predetermined velocity, a first scanning tube coupled to said offset oscillator means for applying an electron beam to the screen thereof for providing light spots thereon, control means coupled to said first scanning tube and to said radar means for sweeping said electron beam in synchronism with the range represented by said doppler history signals, said first tube being biased to respond to the amplitudes of said doppler history signals to said doppler history signals as sinusoidal variations of intensity on said storage film in parallel range elements, a second scanning tube mounted adjacent to said storage film to apply an electron beam to the screen thereof for providing light spots which are imaged on said storage film, a programmer coupled to said second scanning tube for developing a first sweep signal so said light spots sweep a portion of the recorded doppler history of a range element and for developing a second sweep signal so that said second scanning tube sequentially sweeps through said portions of each of said plurality of range elements in continuous scanning frames, photo sensing means mounted adjacent to said intermediate storage film for developing signals during each frame having frequencies proportional to said scanned portion of said doppler history signals, a mixer coupled to said photo sensing means, a swept oscillator coupled to said mixer, a variable gain amplifier coupled to said swept oscillator and to said programmer to control said swept oscillator to develop repetitive reference signals of varying frequency during each interval of time equal to said first sweep signal, said reference signals changing in rate of frequency variation as said second scanning tube scans different range elements, said mixer developing correlation signals having frequencies equal to the difference between the signals developed by said photo sensing means and said reference signals, filter means coupled to said mixer and having a selected frequency band to pass said correlation signals at a predetermined frequency as integrated signals, directing means coupled to said filter means for developing an envelope signal in response to said integrated signals, a third scanning tube coupled to said detecting means and to said programmer to apply an electron beam to the screen thereof and develop light spots thereon in response to said second voltage sweep, said light spots having an intensity controlled by said integrated signal, and a map film mounted adjacent to said third tube and coupled to said intermediate film to move at a proportional velocity thereto, said map film responding to the light spots of said third tube to provide focused indications of said objects being mapped.

13. A system for mapping objects in a range interval opposite a moving craft comprising pulsed coherent radar means having an antenna mounted on the side of said craft for illuminating said objects being mapped and for obtaining doppler history signals of said objects being illuminated, said doppler history signals varying in frequency and having a zero frequency when said objects is opposite said craft, offset oscillator means coupled to said radar means for shifting the frequency of said doppler history signals so that said zero frequency is shifted to a selected frequency, an intermediate storage film moving with a predetermined velocity, a first scanning tube coupled to said offset oscillator means for developing an electron beam to provide light spots on the screen thereof, control means coupled to said first scanning means and to said radar means for sweeping said electron beam in synchronism with the range represented by said doppler history signals, said first tube being biased to respond to the amplitudes of said doppler history signals to record doppler history signals as sinusoidal variations of intensity on said storage film in parallel range elements, a second scanning tube mounted adjacent to said storage film to apply an electron beam thereto to provide light spots on the screen thereof, a programmer coupled to said second scanning tube for developing a first sweep signal so said light spots provided by said electron beam sweep a portion of the recorded doppler history of said range elements and for developing a second sweep signal so that said second scanning tube sequentially sweeps through portions of each of said plurality of range elements in continuous frames, photo sensing means mounted adjacent to said intermediate storage film for developing frequency varying signals during each frame having frequencies proportional to the frequencies of said scanned portion of said doppler history signals, a mixer coupled to said photo sensing means, a swept oscillator coupled to said mixer and to said programmer for developing reference signals during intervals of time equal to said first sweep signals and varying in frequency over a range, said mixer developing correlation signals having frequencies equal to the frequency difference between the signals developed by said photo sensing means and said reference signals, filter means coupled to said mixer and having a selected frequency band to pass said correlation signals at a predetermined frequency as integrated signals, detecting means coupled to said filter means for developing an envelope signal in response to said integrated signals developed by said filter means, a third scanning tube coupled to said detecting means and to said programmer for sweeping an electron beam in response to said second sweep signal to develop light spots on the screen thereof, said beam and said light spots having an intensity controlled by said envelope signal, and a map film mounted adjacent to said third tube and coupled to said intermediate film to move at a velocity proportional thereto, said map film responding to the light spots of said third tube to provide indications of said objects being mapped.

14. A synthetic antenna array system operable from a craft moving relative to objects for indicating the objects with a high degree of resolution comprising a coherent transmitter and receiver mounted on the craft including an antenna to illuminate the object and receive a plurality of doppler history signals therefrom as the craft moves, storage means, recording means coupled to said receiver and to said storage means for storing the doppler history signals in range elements, reading means coupled to said recording means, programming means coupled to said reading means to control said reading means to sequentially sample said range elements to form sampling signals, the amount of information sampled in each range element being a predetermined portion of a doppler history signal, comparison means coupled to said reading means, swept oscillator means coupled to said programming means and to said comparison means for applying a reference signal thereto varying over a preselected frequency range, said comparison means comparing the frequency of said sampling signals with the frequency of said reference signals to develop a difference signal, filter means coupled to said comparison means for comparing the frequency of said difference signal with a fixed frequency pass band representing an angular position of said objects relative to the craft, detecting means coupled to said filter means for developing a detected signal, and display means coupled to said detecting means to said storage means and to said programming means for providing an indication of said objects, said system developing a resolution from said antenna substantially equivalent to the resolution of a synthetic array antenna having a width equal to the distance said craft moves to obtain said predetermined portion of a doppler history signal.

15. A mapping system operable over an area in a range interval from a craft moving in azimuth relative to objects being mapped comprising a coherent radar system including a transmitter and receiver for developing a plurality of doppler signal components having a frequency variation representative of the azimuth position of the objects relative to the position of the moving craft and having a predetermined frequency when reflected from objects having a predetermined position in azimuth relative to said craft, a storage medium movable at a velocity proportional to the velocity of said craft, recording means coupled to said receiver for sequentially recording as sinusoidal variations of intensity said doppler signal components in parallel range elements, scanning means mounted adjacent to said recording means for scanning the recorded information, programming means coupled to said scanning means for developing a first sweep signal having a duration so said scanning means scans a portion of a range element and for developing a second sweep signal so said scanning means sequentially and continually scans each range element, sensing means mounted adjacent to said recording means for developing informational signals having a frequency proportional to the recorded doppler signal components, mixing means coupled to said sensing means, swept oscillator means coupled to said mixing means and to said programming means for continually developing a reference signal having a frequency variation over a selected frequency range during a time interval determined by said first sweep signal, said mixer developing a plurality of correlation signals having a difference frequency representative of a predetermined azimuth position of said objects, narrow band filter means coupled to said mixing means for responding to said correlation signals at a predetermined difference frequency, dumping means coupled to said filter means and to said programming means for deenergizing said filter means at the termination of each of said first sweep signals, detecting means coupled to said filter means for developing a detecting signal indicative of said predetermined azimuth position of said objects, map recording means coupled to said recording means for moving at a predetermined velocity indicative of azimuth position of the area, and display scanning means coupled to said detecting means and to said programming means for continually sweeping said map recording means with a time interval determined by said second sweep signal and responding to said detecting signal to provide an indication of the objects on said map.

16. A system for providing focused mapping of objects in a fixed range interval opposite a moving craft in response to doppler history signals recorded on an intermediate storage film and having frequency and time of occurrence characteristics representative of position of a plurality of objects, said doppler history signals being recorded as intensity variations in a plurality of range elements comprising a first scanning tube mounted adjacent to said storage film to apply an electron beam to the screen thereof for developing light spots which are imaged to said storage film, a programmer coupled to said first scanning tube for developing a first sweep signal so said light spots resulting from said electron beam sweep a portion of the recorded doppler history at each of the plurality of range elements and for developing a second sweep signal so that said first scanning tube sequentially sweeps through said plurality of range elements in repetitive frames, photo sensing means mounted adjacent to said intermediate storage film for developing informational signals during each frame having frequencies proportional to said scanned portions of said doppler history signals, a mixer coupled to said photo sensing means, a swept oscillator coupled to said mixer, oscillator control means coupled between said programmer and said swept oscillator for responding to said first and second sweep signals to control said swept oscillator to develop reference signals during times equal to said first sweep signals and varying over a predetermined frequency range at a rate of frequency change indicative to the rate of frequency change of said informational signals at each range interval, said mixer developing correlation signals having a frequency equal to the frequency difference between said informational signals and said reference signals, filter means coupled to said mixer and having a selected frequency band to pass said correlation signals at a fixed frequency, detecting means coupled to said filter means for developing an envelope signal in response to signals passed through said filter means, a second scanning tube coupled to said detecting means and to said programmer for sweeping an electron beam across the screen thereof to develop light spots thereon in response to said second sweep signal having an intensity controlled by said envelope signal, and a map film mounted adjacent to said second tube and coupled to said intermediate film to move at a proportional velocity thereto, said map film responding to said light spots of said second tube to provide indications of said objects being mapped.

* * * * *